United States Patent
Reza et al.

(10) Patent No.: US 11,921,593 B2
(45) Date of Patent: Mar. 5, 2024

(54) MULTI-PHASE FILE RECOVERY FROM CLOUD ENVIRONMENTS

(71) Applicant: Rubrik, Inc., Palo Alto, CA (US)

(72) Inventors: Abdullah Reza, Gilroy, CA (US); Vijay Karthik, Sunnyvale, CA (US)

(73) Assignee: Rubrik, Inc., Palo Alto, CA (US)

( * ) Notice: Subject to any disclaimer, the term of this patent is extended or adjusted under 35 U.S.C. 154(b) by 41 days.

(21) Appl. No.: 17/731,073

(22) Filed: Apr. 27, 2022

(65) Prior Publication Data

US 2023/0350767 A1 Nov. 2, 2023

(51) Int. Cl.
*G06F 11/14* (2006.01)
*G06F 16/11* (2019.01)

(52) U.S. Cl.
CPC ...... *G06F 11/1469* (2013.01); *G06F 11/1464* (2013.01); *G06F 16/128* (2019.01); *G06F 2201/84* (2013.01)

(58) Field of Classification Search
CPC ............... G06F 11/1469; G06F 16/128; G06F 11/1464; G06F 2201/84
See application file for complete search history.

(56) References Cited

U.S. PATENT DOCUMENTS

| 10,949,397 | B1 * | 3/2021 | Strauss | G06F 16/1774 |
| 2007/0061540 | A1 * | 3/2007 | Rafert | G06F 16/188 |
| | | | | 711/170 |
| 2010/0312948 | A1 * | 12/2010 | Yano | G06F 12/0804 |
| | | | | 711/170 |
| 2012/0062553 | A1 * | 3/2012 | Yang | G06T 15/00 |
| | | | | 345/419 |
| 2013/0275656 | A1 * | 10/2013 | Talagala | G06F 12/0246 |
| | | | | 711/103 |
| 2016/0292193 | A1 * | 10/2016 | Madanapalli | G06F 21/6218 |
| 2018/0089074 | A1 * | 3/2018 | Li | G06F 12/0238 |
| 2021/0334003 | A1 * | 10/2021 | Agrawal | G06F 3/067 |

* cited by examiner

Primary Examiner — Allen S Lin
(74) Attorney, Agent, or Firm — Holland & Hart LLP

(57) ABSTRACT

A method for recovering files from a filesystem stored across sparse files in a cloud environment is described. According to the method, a data management system may receive a request to read the files. The data management system may identify one or more target address ranges corresponding to the files indicated via the request. The data management system may read index information for the sparse files in the cloud environment. The index information may indicate respective address ranges for data blocks within the sparse files. The data management system may identify one or more data blocks within one or more sparse files as corresponding to address ranges that overlap with the one or more target address ranges based on the index information. The data management system may transmit, to the cloud environment, one or more read requests for the identified one or more data blocks.

18 Claims, 12 Drawing Sheets

MULTI-PHASE FILE RECOVERY FROM CLOUD ENVIRONMENTS

FIELD OF TECHNOLOGY

The present disclosure relates generally to database systems and data processing, and more specifically to multi-phase file recovery from cloud environments.

BACKGROUND

A cloud environment may be employed by one or more users to store, manage, and process data using a shared network of remote servers. Each server may include a hypervisor that may provide a virtual operating platform for running one or more virtual machines within the server. A data management system may be a computing system employed to manage, process, backup, and restore data using a network of computing devices. For example, a data management system may be employed by a user to obtain snapshots of one or more of the user's filesystems that are executing within one or more hypervisor platforms. The data management system may, in some aspects, store the snapshots in an archive location, such as a cloud environment.

In some systems, the data management system may store incremental snapshots in the form of sparse files in a cloud environment. As such, some information representative of a single file in the filesystem may be stored across multiple sparse files and in discontinuous locations within the cloud environment. If a user requests to read or restore a file from the cloud environment, the data management system may potentially issue a relatively large quantity of read requests to the cloud, with different read requests for relatively small address ranges, to retrieve the data, which may increase latency and complexity and decrease throughput.

DETAILED DESCRIPTION

Figure 1:
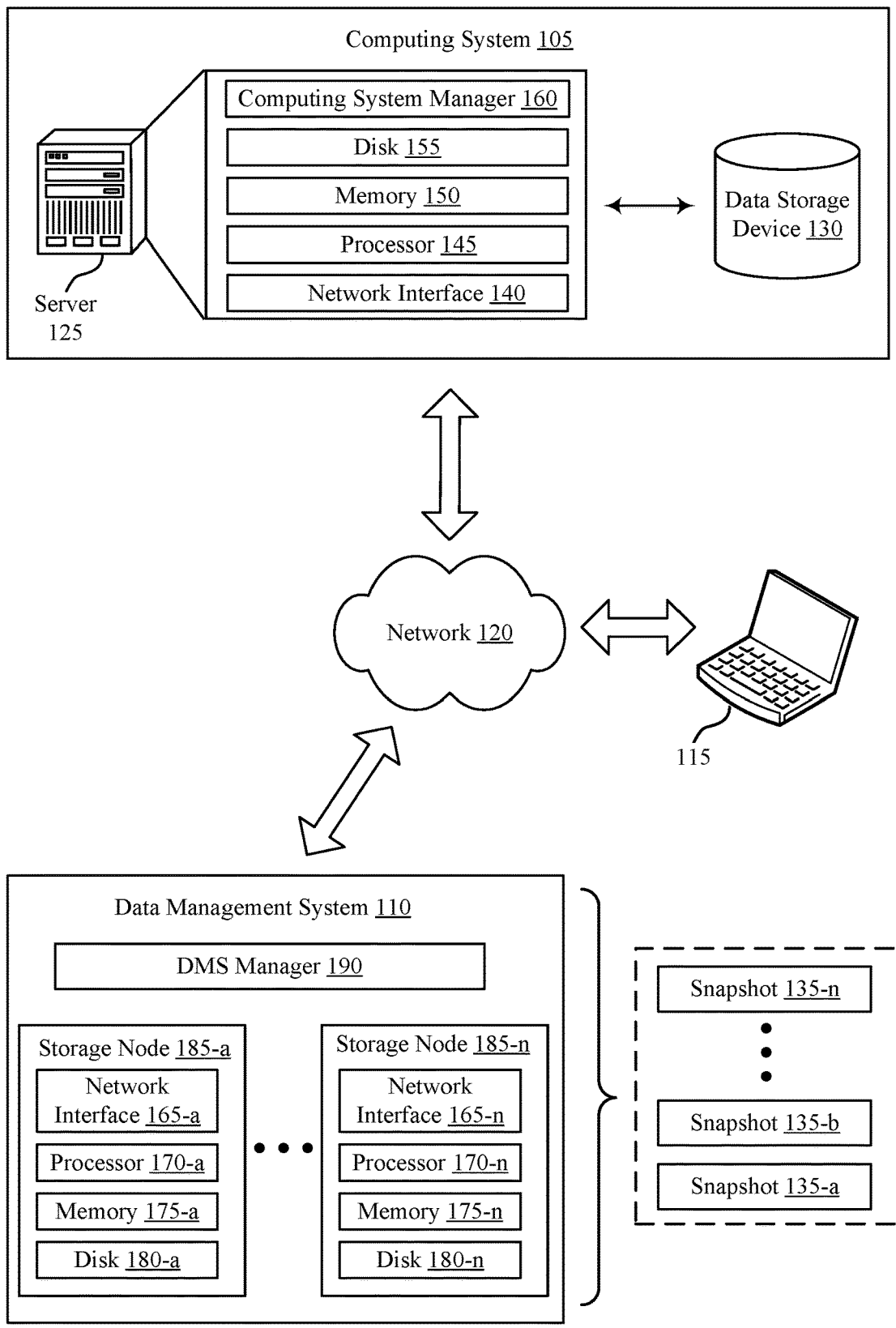
FIG. 1 illustrates an example of a computing environment that supports multi-phase file recovery from cloud environments in accordance with aspects of the present disclosure.

A data management system may obtain incremental snapshots of a client's data and store the snapshots as sparse files in an archive location, such as a cloud environment. The client data may, in some aspects, correspond to a filesystem that may be mapped to a logical address space. A file in the filesystem may be associated with a respective logical address range in the logical address space. For a given incremental snapshot, a corresponding sparse file in which the incremental snapshot is stored may include data blocks corresponding to client data that has changed since a previous snapshot. That is, the logical address ranges associated with the data blocks of an individual sparse file may not span the entire logical address space for the client data, and there may be gaps between the different logical address ranges associated with the data blocks of the sparse file. As such, data within a single file of the client's file system may be stored across multiple sparse files and in discontinuous physical locations within the cloud environment. If a user requests to read or restore a file from the cloud environment, the data management system could potentially issue a relatively large quantity of read requests to the cloud, with the different read requests for relatively small address ranges, to obtain the data. Additionally or alternatively, consecutive read requests may be for scattered locations within the cloud environment, which may increase latency (e.g., the cloud environment may not be able to execute the requested reads in parallel).

Techniques described herein provide for the data management system to retrieve sparse files from the cloud using fewer read requests, read requests that support parallel execution at the cloud environment, or both to improve throughput and reduce latency. The data management system may store mapping information for each snapshot that is obtained by the data management system. The mapping information may indicate logical address ranges within the logical address space associated with the filesystem that correspond to data blocks of the snapshot. The data management system may store the logical address ranges in entries in a metadata table, the entries indexed according to files of the filesystem. If the data management system receives a request to retrieve data for one or more files from the cloud, the data management system may reduce latency associated with the retrieval of data from sparse files in the cloud environment by performing a read operation in two or more phases.

In a first phase, the data management system may identify target address ranges corresponding to the one or more files requested via the read request. The data management system may identify the target address ranges based on the entries in the metadata table corresponding to the requested one or more files. The data management system may read index information for the sparse files in the cloud based on the target addresses. A sparse file may include one or more index blocks, which may include index information that indicates respective logical address ranges associated with each data block of the sparse file. The data management system may read the index blocks of the sparse files but may refrain from reading the data blocks to reduce latency. The data management system may identify which data blocks from which sparse files in the cloud environment include data corresponding the one or more requested files based on reading the index information. The data management system may store pointers to the identified one or more data blocks.

By storing the target address ranges and the pointers to the one or more data blocks in the cloud, the data management system may have sufficient information to group target data blocks that are within a same sparse file or within contiguous sparse files when issuing read requests to the cloud. The described read request generation techniques may thus provide for the DMS to obtain such data blocks via relatively fewer read requests for larger address ranges, read requests that support parallel execution in the cloud environment, or both. In a second phase of the read operation, the data management system may transmit the read requests to the cloud environment and write the requested data to a journal file at the data management system. Thus, the information obtained during the first phase of the read operation may support intelligent configuration of the later read requests for the data blocks, which may provide for reduced latency of the subsequent read requests and the read operation overall.

Aspects of the disclosure are initially described in the context of an environment supporting multi-phase file recovery from cloud environments. Additional aspects of the disclosure are described with reference to patch file architectures, block device architectures, metadata tables, and process flows. Aspects of the disclosure are further illustrated by and described with reference to apparatus diagrams, system diagrams, and flowcharts that relate to multi-phase file recovery from cloud environments.

FIG. 1 illustrates an example of a computing environment 100 that supports computing resource migration across cloud environments in accordance with aspects of the present disclosure. The computing environment 100 may include a computing system 105, a data management system 110, and one or more computing devices 115, which may be in communication with one another via a network 120. The computing system 105 may generate, store, process, modify, or otherwise use associated data, and the data management system 110 may provide one or more data management services for the computing system 105. For example, the data management system 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the data management system 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the data management system 110, or both. For example, a user of the computing device 115 may provide user inputs via the computing device 115, which may result in commands, data, or any combination thereof being communicated via the network 120 to the computing system 105, the data management system 110, or both. Additionally or alternatively, a computing device 115 may output (e.g., display) data or other information received from the computing system 105, the data management system 110, or both. A user of a computing device 115 may, for example, use the computing device 115 to interact with one or more user interfaces (e.g., graphical user interfaces) to operate or otherwise interact with the computing system 105, the data management system 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the data management system 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., solid-state drives and hard disk drives) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more CPUs and/or one or more GPUs. The memory 150 may comprise one or more types of memory (e.g., RAM, SRAM, DRAM, ROM, EEPROM, Flash, etc.). Disk 155 may include a hard disk drive and/or a solid-state drive. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to computing devices interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The data management system 110 may provide one or more data management services for data associated with the computing system 105 and may include DMS manager 190 and any quantity of storage nodes 185. The DMS manager 190 may manage operation of the data management system 110, including the storage nodes 185. Though illustrated as a separate entity within the data management system 110, the DMS manager 190 may in some cases be implemented (e.g., as a software application) by one or more of the storage nodes 185. In some examples, the storage nodes 185 may be included in a hardware layer of the data management system 110, and the DMS manager 190 may be included in a software layer of the data management system 110. In the example illustrated in FIG. 1, the data management system 110 is separate from the computing system 105 but in communication with the computing system 105 via the network 120. It is to be understood, however, that in some examples at least some aspects of the data management system 110 may be located within computing system 105. For example, one or more servers 125, one or more data storage devices 130, and at least some aspects of the data management system 110 may be implemented within the same cloud environment or within the same data center.

Storage nodes 185 of the data management system 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs and/or one or more GPUs. The memory 150 may comprise one or more types of memory (e.g., RAM, SRAM, DRAM, ROM, EEPROM, Flash, etc.). A disk 180 may include a hard disk drive and/or a solid-state drive. Memories 175 and disks 180 may comprise hardware storage devices. Collectively, the storage nodes 185 may in some cases be referred to as a storage cluster or as a cluster of storage nodes 185.

The data management system 110 may provide a backup and recovery service for the computing system 105. For example, the data management system 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the data management system 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the data management system 110 (e.g., the agent may be software installed at and executed by one or more servers 125), and the agent may cause the computing system 105 to generate the snapshot 135 and transfer the snapshot to the data management system 110 in response to the request from the data management system 110. In some examples, the computing system manager 160 may cause the computing system 105 to transfer, to the data management system 110, data that represents the frozen state of the target computing object, and the data management system 110 may generate a snapshot 135 of the target computing object based on the corresponding data received from the computing system 105.

Once the data management system 110 receives, generates, or otherwise obtains a snapshot 135, the data management system 110 may store the snapshot 135 at one or more of the storage nodes 185. The data management system 110 may store a snapshot 135 at multiple storage nodes 185, for example, for improved reliability. Additionally or alternatively, snapshots 135 may be stored in some other location connected with the network 120. For example, the data management system 110 may store more recent snapshots 135 at the storage nodes 185, and the data management system 110 may transfer less recent snapshots 135 via the network 120 to a cloud environment (which may include or be separate from the computing system 105) for storage at the cloud environment, a magnetic tape storage device, or another storage system separate from the data management system 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the data management system 110, the computing system manager 160 may release the target computing object from the frozen state, and any corresponding updates written to the separate file or other entity may be merged into the target computing object.

In response to a restore command (e.g., from a computing device 115 or the computing system 105), the data management system 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the data management system 110 (e.g., in the storage nodes 185) or in some other location connected with the network 120 (e.g., in a cloud environment, which in some cases may be separate from the computing system 105).

In some examples, the data management system 110 may restore the target version of the computing object and transfer the data of the restored computing object to the computing system 105. And in some examples, the data management system 110 may transfer one or more snapshots 135 to the computing system 105, and restoration of the target version of the computing object may occur at the computing system 105 (e.g., as managed by an agent of the data management system 110, where the agent may be installed and operate at the computing system 105).

In response to a mount command (e.g., from a computing device 115 or the computing system 105), the data management system 110 may instantiate data associated with a point-in-time version of a computing object based on a snapshot 135 corresponding to the computing object (e.g., along with data included in a backup copy of the computing object) and the point-in-time. The data management system 110 may then allow the computing system 105 to read or modify the instantiated data (e.g., without transferring the instantiated data to the computing system). In some examples, the data management system 110 may instantiate (e.g., virtually mount) some or all of the data associated with the point-in-time version of the computing object for access by the computing system 105, the data management system 110, or the computing device 115.

In some examples, the data management system 110 may store different types of snapshots, including for the same computing object. For example, the data management system 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the data management system 110 may provide a data classification service, a malware detection service, a data transfer or replication service, backup verification service, or any combination thereof, among other possible data management services for data associated with the computing system 105. For example, the data management system 110 may analyze data included in one or more computing objects of the computing system 105, metadata for one or more computing objects of the computing system 105, or any combination thereof, and based on such analysis, the data management system 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the data management system 110 may detect whether aspects of the computing system 105 have been impacted by malware (e.g., ransomware). Additionally or alternatively, the data management system 110 may relocate data or create copies of data based on using one or more snapshots 135 to restore the associated computing object within its original location or at a new location (e.g., a new location within a different computing system 105). Additionally or alternatively, the data management system 110 may analyze backup data to ensure that the underlying data (e.g., user data or metadata) has not been corrupted. The data management system 110 may perform such data classification, malware detection, data transfer or replication, or backup verification, for example, based on data included in snapshots 135 or backup copies of the computing system 105, rather than live contents of the computing system 105, which may beneficially avoid adversely impacting other aspects of the performance of the computing system 105.

Techniques described herein may support recovery of files from a cloud computing environment in one or more stages, which may reduce latency, reduce overhead, and improve throughput of recovery operations. In some aspects, the data management system 110 may obtain snapshots 135 of a client's data over time and store the snapshots locally (e.g., in a storage node 185) or in an archive location, such as a server 125 or other location in a cloud computing environment. In some aspects, snapshots 135 that are stored in the cloud computing environment may be in the form of sparse files. For example, an incremental snapshot 135 may be represented by data blocks in a respective sparse file. A sparse file may, in some aspects, be referred to as a patch file and may be implemented as a key-value store. For example, a patch file may store data blocks that have changed since a most recent snapshot 135 was obtained, as well as offsets to the data blocks. The patch files may be located in continuous or discontinuous locations within the cloud computing environment (e.g., or other server 125 or data storage device 130 in which they are stored). Patch file architectures are described in further detail elsewhere herein, including with reference to FIG. 2.

To read a data block from a given snapshot, the data management system 110 may traverse a chain of patch files (e.g., a patch file chain) starting from a most recent snapshot 135 to an oldest snapshot 135 in the chain until the data block is identified. The chain of patch files may be abstracted by the data management system 110 using a block device that includes or is associated with logic (e.g., a table or file) for mapping physical addresses of the patch files to logical addresses. Such a block device may be referred to as a merged journal file (MJF) herein. An example block device for mapping sparse files is illustrated and described in further detail elsewhere herein, including with reference to FIG. 3.

A client may send a request to the data management system 110 via the computing device 115 and the networks 120 to restore one or more files from snapshots 135 (e.g., a backup) of a filesystem that is stored in the cloud. The client may or may not know that the snapshots 135 have been uploaded to the cloud computing environment for long term retention by the data management system 110. The data management system 110 may, in some cases, create or generate a block device for the filesystem and mount the filesystem to the block device (e.g., an MJF), such that the client may access the filesystem. The files of the client's filesystem (e.g., a new technology file system (NTFS) or some other type of filesystem) may be mapped to a logical address space of the filesystem randomly, such that data blocks representative of the files may be mapped to any logical address space or range within the block device without a particular order. In such cases, the data management system 110 may not be able to predict or identify which logical ranges may be read from the filesystem at a given time. As such, the data management system may issue a relatively large quantity of read requests to the cloud computing environment that may each be for a relatively small range of data. Each read request may be for a different range in the cloud computing environment at which the requested data may be stored. In some cases, the read requests may result in downloading redundant data.

Additionally or alternatively, the requested data may be associated with a relatively large range of logical addresses. However, the requested data may be included within or mapped to multiple relatively small physical ranges (e.g., contiguous or discontinuous data blocks) within one or more different patch files in the cloud computing environment. Cloud reads may occur per patch file. As such, the data management system 110 may issue multiple read requests each associated with a relatively small range of data or quantity of data blocks within a respective patch file in the cloud. The data management system 110 may not perform parallel reads or coalesce reads without knowing the ranges in the cloud that may be read from each patch file.

As described herein, the data management system 110 may perform the restoration of the requested data from the cloud computing environment in one or more phases to reduce latency and improve throughput. For example, the data management system 110 may, upon receiving the request from the client, identify logical address ranges that correspond to the requested data based on index jobs performed by the data management system 110 when the backups are obtained. The data management system 110 may sort the identified logical address ranges and perform a dry read of the cloud computing environment. To perform the dry read, the data management system 110 may read index information in the cloud computing environment. The index information may be smaller than the data blocks and may identify respective address ranges for data blocks within the patch files. The data management system 110 may store the identified data blocks.

By performing the preliminary dry read of the cloud computing environment, the data management system 110 may generate read requests to retrieve the requested data from the cloud computing environment in an efficient manner. For example, the data management system 110 may identify data blocks, patch files, logical address ranges, or any combination thereof associated with the requested data that may be contiguous. The data management system 110 may group or coalesce such data and issue a single read request for a larger range or group of data accordingly. Additionally or alternatively, the data management system 110 may issue the read requests in parallel. The described techniques may thus reduce latency and improve throughput of read requests to the cloud computing environment.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
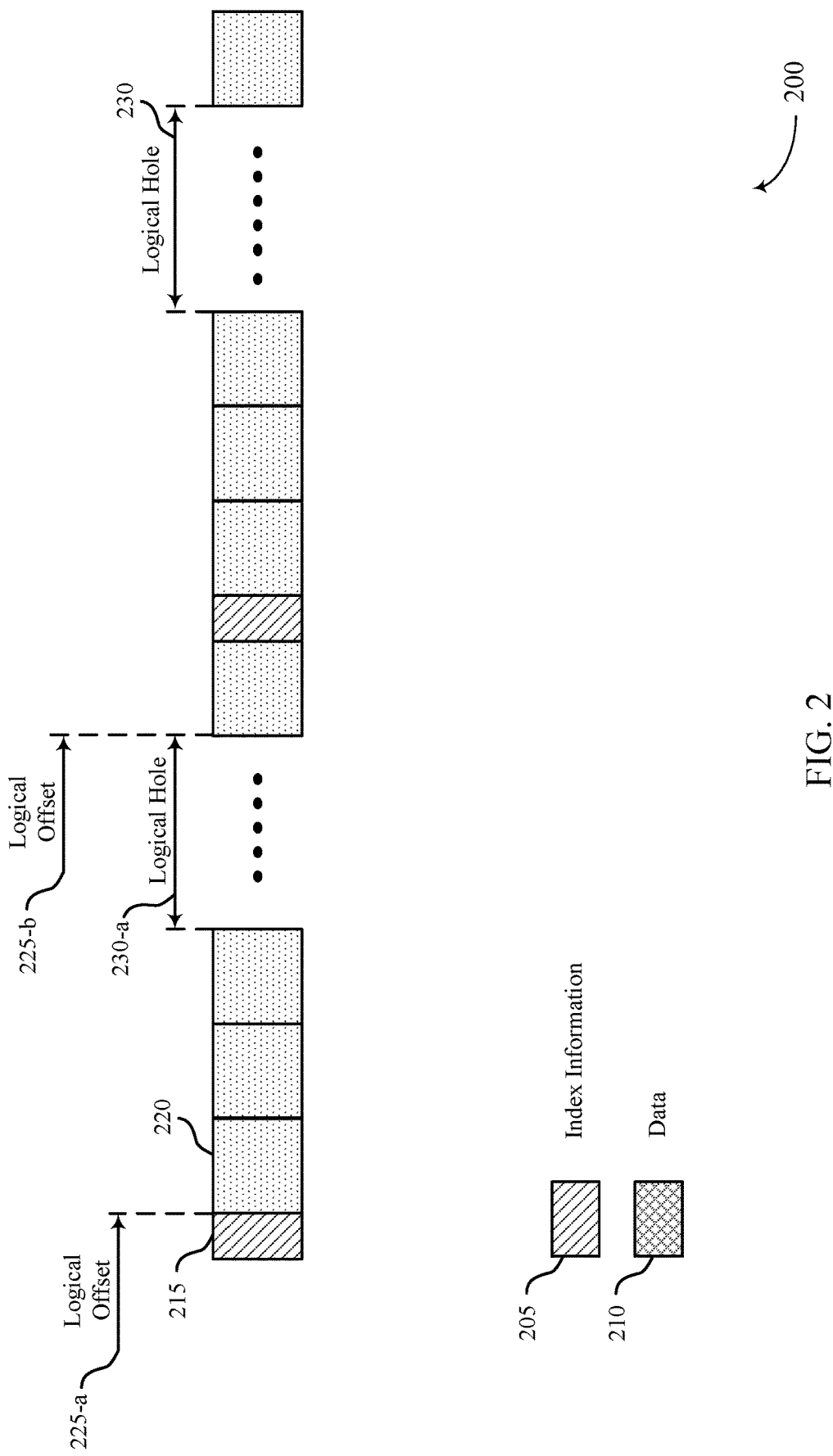
FIG. 2 illustrates an example of a patch file architecture that supports multi-phase file recovery from cloud environments in accordance with aspects of the present disclosure.

FIG. 2 illustrates an example of a patch file architecture 200 that supports multi-phase file recovery from cloud environments in accordance with aspects of the present disclosure. The patch file architecture 200 may implement or be implemented by aspects of the computing environment 100 described with reference to FIG. 1. For example, the patch file architecture 200 illustrates contents of an example patch file that may be laid out on a disk within a cloud environment, such as a disk within a server 125 or a data storage device 130 in a cloud computing environment, as described with reference to FIG. 1.

A data management system may obtain snapshots of a client's filesystem and store or archive the snapshots in the cloud or some other archive location. Each time a snapshot is obtained by the data management system, the snapshot may be stored in one or more data blocks 220 of an available file. For example, if a snapshot of the filesystem is obtained at a first point in time and stored in a first set of data blocks 220 in the cloud environment, the first set of data blocks 220 may include data, metadata, or both that represents the filesystem at the first point in time. The data blocks 220 may include a same or different quantity of data (e.g., 64 kilobytes (KBs), or some other quantity).

The snapshots may, in some aspects, be incremental snapshots. An incremental snapshot may include data blocks 220 that represent data in the filesystem that has changed since a most recent snapshot or backup of the filesystem was obtained. Such data blocks 220 may be referred to as changed data blocks herein. In some aspects, the changed data blocks 220 in a snapshot may be discontinuous within a logical address space associated with the filesystem. For example, a first changed data block 220 in an incremental snapshot may be associated with or mapped to a first logical address range near a beginning of the logical address space and a second changed data block 220 in the incremental snapshot may be associated with or mapped to a second logical address range near an end of the logical address space.

To improve storage allocation efficiency for such incremental snapshots, the incremental snapshots may be stored in the form of patch files in the archive location. Patch files may represent an example of a sparse file herein. A sparse file may include one or more regions of unallocated data, which may provide for efficient storage allocation for relatively large quantities of data. The sparse file may save storage space by recording actual data and representing the unallocated data regions with zero values, such that the unallocated data regions may not occupy disk space. In the provided example, the first and second changed data blocks 220 of the incremental snapshot may be stored in physically contiguous locations within the sparse file (e.g., associated with continuous or consecutive physical addresses), but the corresponding logical address ranges near the beginning and the end of the logical address space, respectively, may be discontinuous. The discontinuity between the logical address ranges may be referred to as an unallocated data region or a logical hole 230, in some aspects.

Sparse files that include data blocks 220 that have changed since a previous snapshot may, in some aspects, be implemented as a key-value store. Such key-value store sparse files may be referred to as patch files herein, and may be illustrated in FIG. 2. A key for a given patch file may be a logical offset 225 of the data within the logical address space associated with the filesystem. A value of the patch file may be one or more data blocks 220 (e.g., a 64 KB data block 220, or some other size of data blocks 220) that include data 210. A patch file for a given snapshot may contain keys (e.g., logical offsets 225) for data blocks 220 that have changed since the most recent prior snapshot. A given patch file may store changed data blocks 220 for a single snapshot.

For example, a first snapshot of a filesystem that is obtained at a first time may represent all of the data and metadata of the filesystem at the first time. The first snapshot may be stored in one or more contiguous data blocks 220 of a first patch file. The one or more contiguous data blocks 220 may be mapped to consecutive logical address ranges across a logical address space associated with the filesystem. That is, the patch file may include a single logical offset 225 (e.g., key) for a first logical address within the logical address space, and the data blocks 220 may span a full range associated with the logical address space. A second snapshot of the filesystem that is obtained at a second time after the first time may include changed data blocks 220 that represent data and metadata of the filesystem that has changed since the first time, such as data or metadata that has been written to or deleted from the filesystem since the first time. The second snapshot may be stored across one or more data blocks 220 in a second available patch file. The second patch file may be next to or separated from the first patch file in the cloud environment (e.g., in contiguous or discontinuous physical address ranges). The second patch file may include one or more logical offsets 225 (e.g., keys) for the changed data blocks 220. The data blocks 220 may be physically contiguous in the second patch file in the cloud environment, but there may be one or more logical holes 230.

In the example of FIG. 2, the logical offset 225-a may indicate a first set of three data blocks 220 in a patch file that are associated with continuous logical addresses. A fourth data block 220 in the patch file may be associated with a physical address that is contiguous to a physical address of the third data block 220, but may be discontinuous from the first through third data blocks 220 in the logical address space. For example, the fourth data block 220 may be separated from the third data block 220 by the logical hole 230-*a*. The patch file may thus include the first logical offset 225-*a* to the first data block 220 and the second logical offset 225-*b* to the fourth data block 220.

The patch files may include one or more index blocks 215 that facilitate the key-value lookup scheme for the patch files. An index block 215 may include index information 205 that indicates the one or more logical offsets 225 for data blocks 220 within the patch file. For example, the index information 205 may include metadata or data that identifies one or more logical offsets 225 (e.g., keys) and ranges associated with each logical offset 225. An index block 215 may be associated with or may identify a group of one or more data blocks 220 within a patch file. A size of an index block 215 may be smaller than a size of a data block 220. That is, index information in an index block 215 may include a first quantity of bytes that is less than a second quantity of bytes of data 210 that are included in the one or more data blocks 220 to which the index information 205 pertains. In some aspects, an index block 215 that includes 200 KB of index information 205 may be used to index data blocks 220 that include a combined quantity of up to one gigabyte (GB) of data 210. As such, index blocks 215 may provide for a data management system to locate data blocks 220 relatively quickly (e.g., without scanning an entire file or filesystem). In some aspects, the index blocks 215 may be at the beginning or end of a patch file. Additionally or alternatively, the index blocks 215 may be interleaved with (e.g., before or after) respective data blocks 220 in the patch file.

To obtain or abstract a logical view of the filesystem at a given time, the data management system may consider each patch file, in order, from an oldest snapshot obtained up to a most recent snapshot. The data management system may abstract such a logical view of a backed-up filesystem using a block device, which may include logic that maps logical addresses of the data blocks 220 to physical addresses or locations within the cloud environment. Such a block device may be referred to as an MJF or a loop device, and may be illustrated and described in further detail with reference to FIG. 3.

Figure 3:
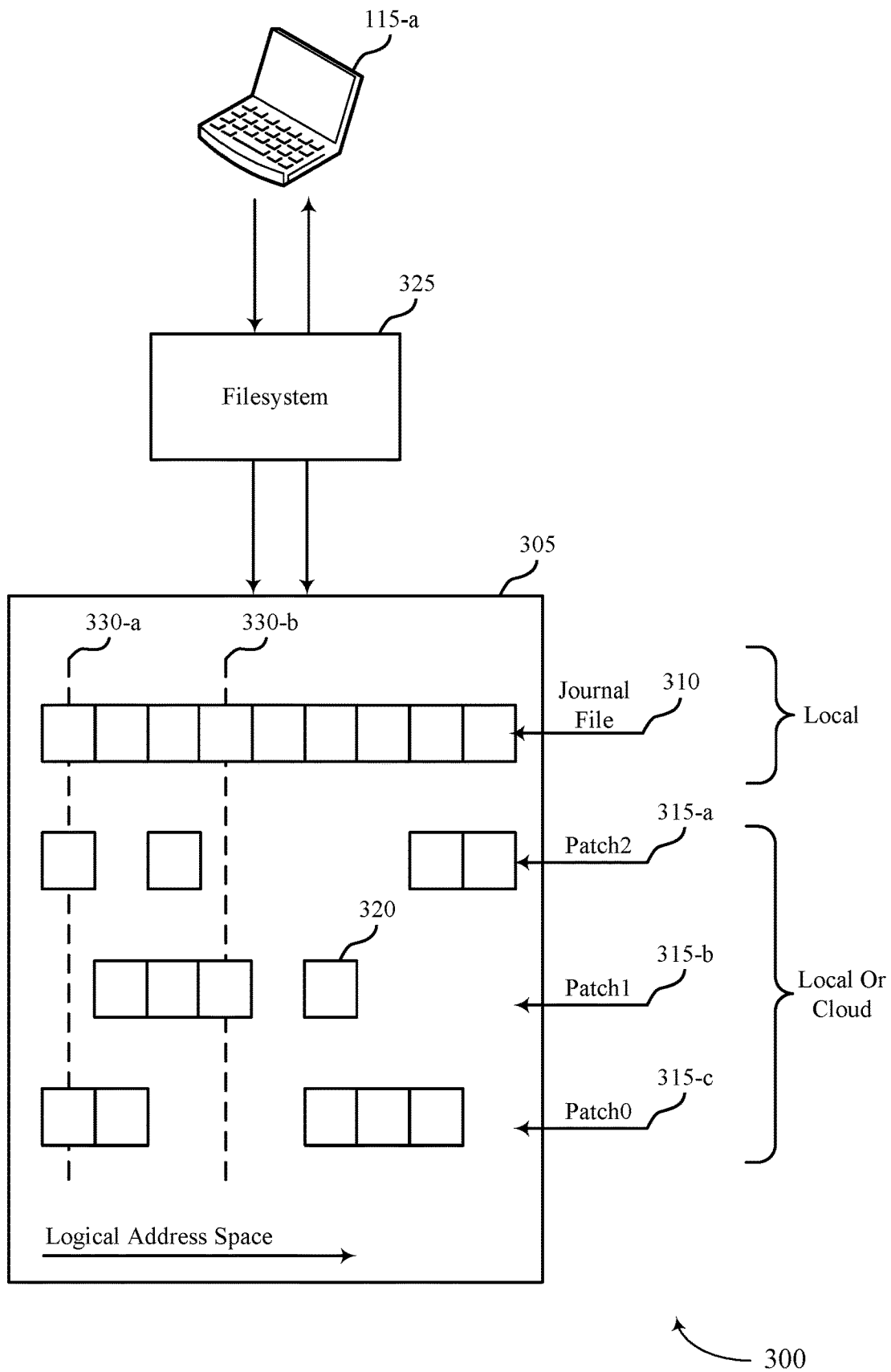
FIG. 3 illustrates an example of a block device architecture that supports multi-phase file recovery from cloud environments in accordance with aspects of the present disclosure.

FIG. 3 illustrates an example of a block device architecture 300 that supports multi-phase file recovery from cloud environments in accordance with aspects of the present disclosure. The block device architecture 300 may implement or be implemented by aspects of the computing environment 100 and the patch file architecture 200 described with reference to FIGS. 1 and 2. For example, the block device architecture 300 illustrates a block device 305 that may map logical addresses of a logical address space associated with a client filesystem 325 to physical addresses within one or more patch files 315, as described with reference to FIG. 2. The block device 305 may be generated and executed by a data management system 110, and may be in communication with a cloud computing environment, as described with reference to FIGS. 1 and 2. In some aspects, the data management system may communicate with a user via a computing device 115-*a* and one or more networks, which may represent examples of corresponding devices and networks described with reference to FIG. 1.

As described with respect to FIG. 2, the data management system may obtain snapshots of a client's filesystem 325 and store the snapshots in the form of sparse files using a key-value store format, which may be referred to as patch files 315 herein. The data management system may store the patch files 315 locally or in an archive location, such as a cloud environment. A patch file 315 may include one or more data blocks 320, which may represent examples of the data blocks 220 described with reference to FIG. 2. Although not illustrated in FIG. 3, a patch file 315 may also include one or more index blocks to index the data blocks 320 within the patch file 315, as described with reference to FIG. 2.

The data blocks 320 in a patch file 315 may include data that has changed since the most recent snapshot or backup was obtained. In the example of FIG. 3, the patch file 315-*c* (e.g., Patch0) may be obtained and stored at a first time, the patch file 315-*b* (e.g., Patch1) may be obtained and stored at a second time after the first time, and the patch file 315-*a* (e.g., Patch2) may be obtained and stored at a third time after the first and second times. The patch file 315-*c* may include five data blocks 320 that include data that has changed since a previous snapshot was obtained. In some aspects, a patch file associated with the snapshot obtained prior to the patch file 315-*c* may be stored in the cloud, in a different location, or may be deleted.

The patch file 315-*b* may include four data blocks 320 that may include data that has changed since the first time at which the snapshot associated with patch file 315-*c* (e.g., Patch0) was obtained. The patch file 315-*a* (e.g., patch2) may include four data blocks 320 that may include data that has changed since the second time at which the snapshot associated with the patch file 315-*b* (e.g., Patch1) was obtained. As such, the patch files 315 may be sparse and incremental with respect to a last snapshot. A chain of such incremental snapshots over time may represent a full image view of the filesystem 325 at a given time. A first snapshot of the filesystem 325 (e.g., a base snapshot) may include data blocks 320 associated with each logical address range in the logical address space of the filesystem 325. For example, the data blocks 320 in the base snapshot may represent all of the files in the filesystem 325. The logical address space of the filesystem 325 may correspond to a range of continuous or discontinuous logical addresses over which the files, data, and metadata in the filesystem 325 are indexed or mapped.

The data management system may generate the block device 305 to obtain a merged view of one or more patch file chains associated with the filesystem 325 that has been backed up using snapshots and stored across multiple patch files 315. The block device 305 may map the logical address ranges of the backed-up data to physical addresses corresponding to locations and offsets of the data within patch files 315 in the cloud environment. The data management system may mount the filesystem 325 on the block device 305, which may be referred to as a loop device, in some aspects, to provide the computing device 115-*a* with access to the merged view of the filesystem 325 (e.g., via a user interface). Although the client filesystem 325 is mounted on the block device 305 and accessible to the computing device 115-*a* via the data management system, the client filesystem 325 may be stored within the patch files 315 in the cloud environment (e.g., the client filesystem 325 is not downloaded or restored from the cloud yet), at the data management system (e.g., locally), or both.

The block device 305 illustrated in FIG. 3 may, in some aspects, be referred to as an MJF, and may represent an example of logic or software that is capable of performing the address mappings (e.g., a conceptual table or file)). The block device 305 may provide a client with a random access view of the filesystem 325 (e.g., as opposed to a log file view, which may be associated with sequential access). For example, the block device 305 may map a respective logical address or logical address range of the filesystem 325 to one or more data blocks 320 in one or more different patch files 315. The block device 305 may index the data blocks 320 in a patch file 315 according to logical address range(s) in the logical address space of the filesystem to which the data blocks 320 pertain. That is, the block device 305 may represent block-level data of a client filesystem 325 that is backed up by the data management system.

The vertical dashed lines in FIG. 3 illustrate examples of logical address ranges 330 within a logical address space of the filesystem 325 for clarity purposes. For example, in the example of FIG. 3, the patch file 315-a and the patch file 315-c may both include a respective data block 320 that is associated with a first logical address range 330-a. The data block 320 in the patch file 315-a that is associated with the first logical address range 330-a may include changed data that may override the data block 320 in the patch file 315-c that is associated with the first logical address range 330-a. The data blocks 320 in the patch files 315-a and 315-c that correspond to the first logical address range 330-a may not be physically contiguous in the cloud. The patch file 315-b may not include a data block 320 that corresponds to the first logical address range 330-a. As such, if a read request is issued for the first logical address range 330-a, the block device 305 may obtain the data from the patch file 315-a, which may be associated with a most recent version of the data. The block device 305 may include logic that is operable to generate a similar conceptual mapping to identify which patch files 315 include data or changed data for other logical addresses or logical address ranges 330 within the logical address space of the filesystem 325.

The block device 305 may include a journal file 310 (e.g., an append-only log file) that may be used to satisfy reads from the patch file chain and to record writes to the block device 305. For example, if the client writes data to the filesystem 325 while the filesystem 325 is mounted on the block device 305, the written data blocks 320 may be appended toward an end of the journal file 310. Existing patch files 315 may, in some aspects, be immutable. As such, the written blocks may be subsequently stored in new patch files 315 in the cloud environment. Additionally or alternatively, the journal file 310 may maintain an index of the logical addresses in the logical address space. The index maintained by the journal file 310 may provide for relatively fast reads of the data within the block device 305. The journal file 310 may be stored locally at the data management system regardless of whether the patch files 315 are stored locally or in the cloud environment.

Although FIG. 3 illustrates spaces between some data blocks 320 in the patch files 315 for clarity, it is to be understood that these spaces may correspond to conceptual logical holes, such as the logical holes 230 described with reference to FIG. 2, and that the data blocks 320 within a same patch file 315 may be physically contiguous in the cloud environment. The patch files 315 may be physically contiguous or separated from one another in the cloud environment. For example, the patch file 315-c may correspond to a first range of physical addresses in the cloud environment and the patch file 315-b may correspond to a second range of physical addresses in the cloud environment. In some aspects, the first and second ranges may be continuous. Additionally or alternatively, the first and second ranges may be separated from one another (e.g., discontinuous).

The client may request to read or retrieve data from the filesystem 325. For example, the client may access the mounted filesystem 325 via the computing device 115-a and may select one or more files to download, restore, retrieve, or otherwise access. In some cases, the block device 305 may be generated or updated in response to the request to read or retrieve data. For example, in response to the request, the data management system may generate the block device 305 by issuing reads to the cloud environment to obtain the requested data. However, the data management system may not know logical address ranges of the requested data, the data management system may not know a range of data blocks 320 within patch files 315 in the cloud that include the requested data, or both. As such, the data management system may issue a relatively large quantity of reads corresponding to relatively small ranges of data within the cloud. Additionally or alternatively, the file may be read directly via the client filesystem 325, such that the data management system may be unable to control sizes of read requests, parallel reads, or both issued to the block device 305 from within the client filesystem 325.

For example, the data blocks in the client filesystem 325 (e.g., an NTFS) may be mapped anywhere in the logical address space of the patch file chain abstracted and merged via the block device 305. Thus, a requested file may include relatively small logical address ranges that may be spread out in any order on the logical space of the block device 305. The data management system may be unable to predict which range may be read next. Thus, if the data management system generates read requests for relatively large amounts of data at a time, some downloaded data may be redundant, which may increase latency and reduce throughput.

Techniques described herein provide for a data management system to identify one or more target address ranges corresponding to the files requested to be read from the filesystem 325 prior to issuing a read request to the cloud environment, which may provide for the data management system to coalesce or group the requested data into fewer read requests for larger ranges of data. By performing a read using the multi-phase techniques described herein, the data management system may improve throughput and reduce latency associated with reads from the cloud.

To support the multi-phase read operations described herein, the data management system may perform one or more indexing operations when the filesystem 325 is backed up. For example, the data management system may obtain and store snapshots of the filesystem 325 in the form of patch files 315 over time, as described with reference to FIG. 2. When the data management system obtains a snapshot, the data management system may generate and execute a corresponding index job. To execute the index job for a given snapshot, the data management system may scan the block device 305 to locate metadata blocks for the filesystem 325. The data management system may retrieve, from the metadata blocks, mapping information for the data blocks 320 associated with or included in the snapshot. The mapping information may indicate or include, for example, one or more logical address ranges associated with the data blocks. As part of the index job, the data management system may generate a metadata table or update one or more entries in an existing metadata table to include the identified logical address ranges for the snapshot. The entries in the metadata table may be indexed according to corresponding files. The metadata table (e.g., a Filesystem MetaData (FMD) table) and techniques for populating the metadata table, as well as retrieving information from the metadata table, are described in further detail with reference to FIG. 4.

Figure 4:
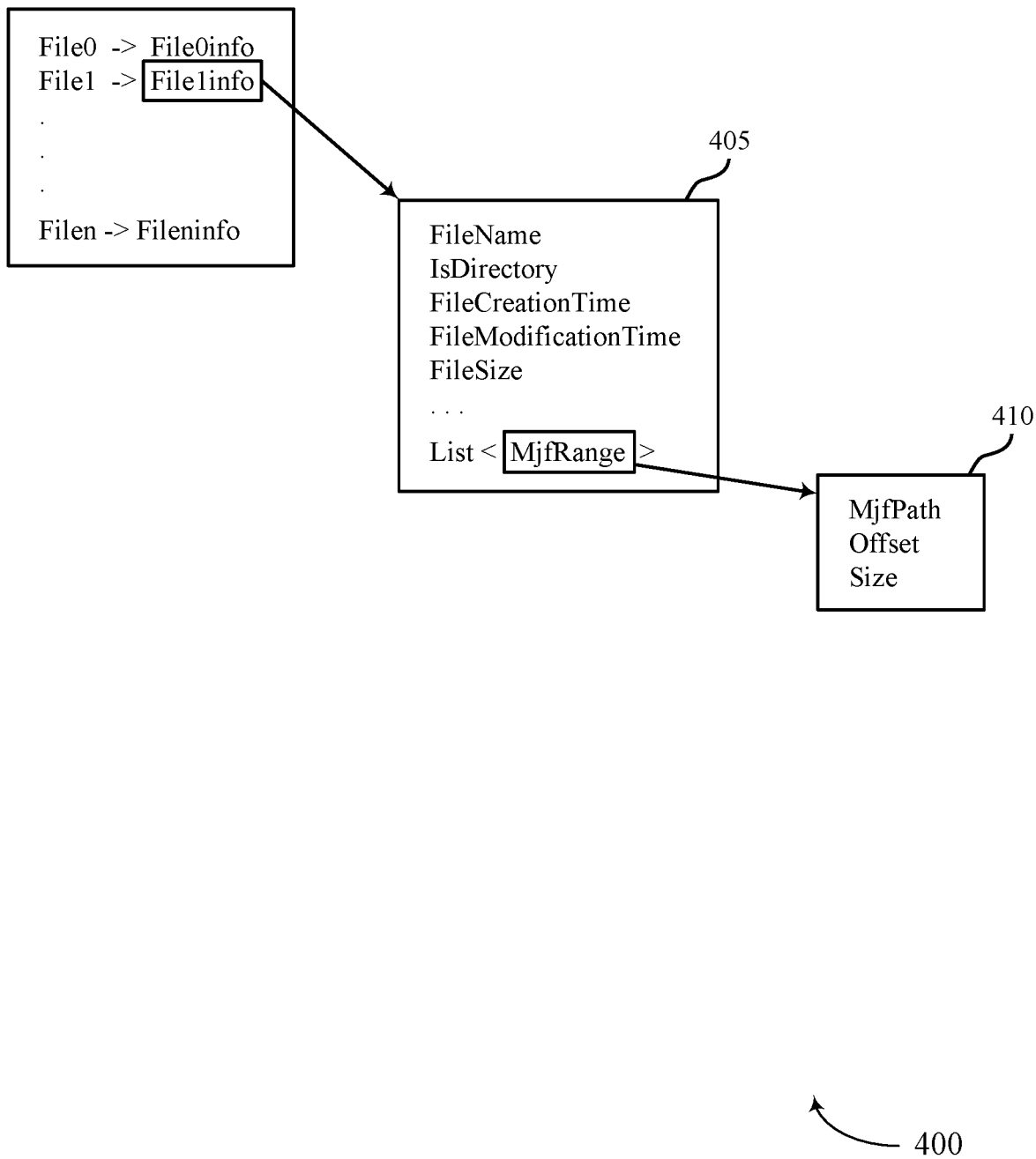
FIG. 4 illustrates an example of a metadata table that supports multi-phase file recovery from cloud environments in accordance with aspects of the present disclosure.

The data management system may present a preview of the filesystem 325 to the client via the computing device 115-*a* (e.g., a user interface) based on the information included in the metadata table, such as the metadata table 400 illustrated in FIG. 4. The client may browse the preview of the filesystem 325 and select one or more files which the client wants to access, recover, or restore. Such a selection may be referred to as a read request. If the data management system receives a read request for one or more files from the client (e.g., via the computing device 115-*a*), the data management system may perform the read operation in two or more phases as described herein to improve throughput and reduce latency.

In a first phase of the read operation, the data management system may scan the metadata table generated based on the index jobs to identify and retrieve logical address ranges 330 associated with the requested one or more files. For example, the data management system may identify entries in the metadata table that are indexed according to the one or more files indicated via the read request, and the entries may include the logical address ranges 330. Such logical address ranges 330 may be referred to as target address ranges. The data management system may, in some aspects, sort the target address ranges in an ascending or descending order (e.g., based on a value of the logical addresses).

The data management system may utilize the target address ranges to perform a preliminary read of index information in the cloud environment. The index information may represent an example of the index information 205 in the index blocks 215, as described with reference to FIG. 2. The preliminary read of the index information may be referred to as a dry read. The data management system may perform the dry read by scanning the cloud environment to read the index blocks while refraining from reading the data blocks 320. An index block may provide index information for multiple data blocks 320, and the index block may be smaller than the multiple data blocks 320 to which it corresponds, such that the dry read may be associated with lower latency as compared with a full read of the index blocks and the data blocks 320 in the cloud environment.

The data management system may identify one or more patch files 315 that include data blocks relevant to the requested one or more files based on reading the index information. For example, the data management system may identify one or more data blocks 320 in the patch files 315 that correspond to address ranges that overlap with the target address ranges identified from the metadata table. The data management system may store pointers to the locations of the one or more identified data blocks 320. The pointers may be stored in a key-value store file at the data management system, which may be referred to as a cloud read profile. A key of a key-value store for a respective data block 320 in the file may be an offset of a logical address range 330 corresponding to the respective data block 320 in the logical address space. A value of the key-value store may include a tuple value. The tuple value may include, for example, an ID of a patch file 315 that includes the respective data block 320, an offset corresponding to the respective data block 320 in the patch file 315, an address range corresponding to the respective data block within the patch file 315 (e.g., a size of the data block 320 in terms of bytes or a range of addresses), or any combination thereof.

In an example, the read request may indicate or request that a first file of the filesystem 325 is read. The data management system may scan the metadata file for an entry corresponding to the first file. The entry in the metadata file that corresponds to the first file may indicate, for example, a first logical address range 330-*a* and a fourth logical address range 330-*b* that correspond to data in the requested first file (e.g., as conceptualized by the dashed vertical lines in FIG. 3). The data management system may read index information in the cloud based on the first and fourth logical address ranges 330-*a* and 330-*b* to identify which patch files 315 include data blocks 320 associated with the first and fourth logical address ranges 330-*a* and 330-*b*. In the example of FIG. 3, the patch files 315-*a* and 315-*c* may include one or more data blocks 320 associated with the first logical address range 330-*a*. The patch file 315-*a* may be associated with a more recent snapshot than the patch file 315-*c*, such that the data block 320 in the patch file 315-*a* may override or be used instead of the data block 320 in the patch file 315-*c*. The patch file 315-*b* may include one or more data blocks 320 associated with the fourth logical address range 330-*b*.

The data management system may store pointers to the data blocks 320 in the patch file 315-*a* and the patch file 315-*b* based on reading the index information. A pointer to the data block 320 in the patch file 315-*a*, for example, may include a key associated with an offset of the first logical address range 330-*a* in the logical address space of the block device 305 and a tuple value including an ID or path of the patch file 315-*a*, an offset of the data block 320 in the patch file 315-*a*, a size of the data block 320 (e.g., an address range or a quantity of bytes), or any combination thereof.

The data management system may generate one or more read requests for the identified data blocks 320. By generating the read requests based on the pointers to the identified data blocks 320, the data management system may download bytes of data that are requested from the cloud. The data management system may refrain from performing predictive fetching, in which some redundant data may be downloaded, which may improve throughput and reduce latency. In some aspects, the data management system may order the identified data blocks 320 (e.g., the pointers to the identified data blocks 320) in an ascending or descending order based on address ranges or locations in the cloud environment. The data management system may identify two or more data blocks 320 that may be coalesced or combined for a single read request, two or more data blocks 320 that may be retrieved via parallel read requests, or both based on the ascending or descending order.

In some aspects, one or more of the identified data blocks 320 may be contiguous within a same patch file 315 or a different patch file 315. For example, the patch file 315-*a* illustrated in FIG. 3 may include two contiguous data blocks 320. In such cases, the data management system may coalesce or group the data blocks 320 into a single read request. The data management system may issue or transmit the single read request to the cloud environment for a range of the two or more contiguous data blocks 320, which may reduce latency and increase throughput as compared with scenarios in which the data management system may issue separate read requests for each data block 320.

Additionally or alternatively, one or more of the identified data blocks 320 may be adjacent within the ascending or descending order, and the data management system may issue parallel read requests for the identified data blocks 320 based on the ascending or descending order. A second read request that is issued in parallel with a first read request may be transmitted to the cloud environment before the first read request has been completed. For example, the cloud environment may process the first read request in a first time period and the data management system may transmit the second read request for a second set of data blocks 320 before the data management system receives the data associated with the first read request in the first time period. By issuing parallel read requests for relatively large quantities of data, the data management system may increase the throughput which the cloud environment is able to service (e.g., execute, provide the responsive data for) the read requests.

The data management system may transmit the read requests, including coalesced or parallel read requests, to the cloud environment. The cloud environment may provide the data blocks 320 corresponding to the requested address ranges to the data management system. The data management system may obtain the requested data blocks 320 and write the data blocks 320 to the journal file 310 of the block device 305, which may be stored locally at the data management system. In some aspects, the steps for identifying target data blocks 320, issuing coalesced read requests, and writing the retrieved data blocks 320 to the local journal file 310 may be part of the first phase of the read operation.

In a second phase of the read operation, the data management system may instantiate the data blocks 320 retrieved from the cloud environment via the mounted filesystem 325 based on the request from the client. The data blocks 320 may be representative of the one or more files requested via the read request. By instantiating the requested files via the mounted filesystem 325, the client may access, use, and view the files via the computing device 115-a while the files may be stored at the data management system. Additionally or alternatively, the data management system may recover the files or restore the files to the computing device 115-a from the journal file 310. By fetching the data blocks 320 from the cloud environment efficiently and storing the data blocks 320 locally at the data management system during the first phase of the read operation, the files may be instantiated, recovered, or restored according to a speed of a local read operation, which may reduce latency as compared with cloud reads. For example, the data management system may refrain from performing a cloud read during the second phase of the read operation.

The data management system may mount the filesystem 325 on the block device 305 before or after retrieving the data blocks 320 from the cloud environment. In some aspects, the data management system may refrain from mounting the filesystem 325 until after the first phase of the read operation, and the data management system may identify the target address ranges and the address ranges of the requested data blocks 320 in the cloud before mounting the filesystem 325. In some other aspects, the filesystem 325 may be mounted while the data management system identifies the requested address ranges. The data management system described herein may thus perform a read operation in multiple phases to improve latency and throughput of cloud read operations.

FIG. 4 illustrates an example of a metadata table 400 that supports multi-phase file recovery from cloud environments in accordance with aspects of the present disclosure. The metadata table 400 may implement or be implemented by aspects of FIGS. 1-3. For example, the metadata table 400 may be generated and stored by a data management system. The metadata table 400 may be used to mount a client filesystem on a block device, which may represent examples of a filesystem 325 and a block device 305 as described with reference to FIG. 3. In some aspects, one or more entries 405 in the metadata table 400 may include mapping information associated with a respective file of the filesystem.

As described with reference to FIGS. 1-3, a data management system may execute an index job at the same time as or based on obtaining a snapshot of a filesystem. In some cases, executing the index job may include mounting the filesystem on a block device at the data management system and traversing the mounted filesystem to generate a list of metadata or other information corresponding to all of the files in the filesystem. In such cases, the index job may be referred to or may be based on a file stat system call. For example, the mounted filesystem may be traversed in a namespace order of the files via filesystem stat calls, which may provide for random input/output (I/O) in the system and increased latency. The information and metadata may be stored in a key-value store file, which may be referred to as FMD. The FMD may provide for the client to access (e.g., preview or browse) the backed-up filesystem mounted on the data management system without retrieving or downloading the data from the cloud. However, mounting the filesystem for each indexing job may be relatively time consuming and complex.

Techniques described herein provide for index jobs to be executed with reduced complexity and latency. To execute an index job for a given snapshot as described herein, the data management system may scan a block device directly to locate metadata blocks for the filesystem. The data management system may or may not mount the filesystem on the block device prior to performing the index job. In some aspects, the filesystem (e.g., an NTFS filesystem or some other type of filesystem) may include a metadata file, such as a master file table (MFT), that may include the information about the files. In such cases, executing the index job may include traversing the MFT for the filesystem to identify the metadata blocks.

By scanning the block device instead of the mounted filesystem, the data management system may scan in a sequential manner, which may provide for sequential I/O in the system and may increase throughput. As such, more information may be extracted per file. Additionally or alternatively, sequential I/O may improve the efficiency with which system resources are utilized, such as by reducing a quantity of associated input/output operations (IOPs) in the system as compared with random I/O, such that the system—which may only support up to a certain quantity of IOPs per unit time—may better be able to support other activities associated with other IOPs. For example, the metadata blocks for the filesystem may include information for a client to browse a backed-up filesystem, as well as additional information, such as a list of address ranges in the block device for a file of the filesystem, which may be referred to as mapping information.

As part of executing the index job for a given snapshot, the data management system may store the information obtained from scanning the block device. The data management system may store the information in the metadata table 400. The metadata table 400 may be stored at the data management system or in some other archived location that may be accessible to the data management system. The metadata table 400 may be indexed according to respective files of the filesystem. That is, a file name or ID may provide an index to an entry 405 in the metadata table 400. The entries 405 in the metadata table 400 may include per-file block maps. A first tier or layer of an entry 405 for a given file may include information and metadata associated with the given file, such as a file name, a directory, a time at which the file was created, a time at which the file was modified, a size of the file, other file information, or any combination thereof.

The first tier or layer of the entry 405 may further include mapping information 410 associated with the given file. The mapping information 410 may correspond to a set (e.g., a list or group) of logical address ranges associated with the file, which may be referred to as target address ranges. The logical address ranges may represent ranges of logical addresses within a logical address space of the block device for the filesystem that correspond to or include data associated with the given file. The data associated with the file may be stored across discontinuous locations in the cloud, such that the logical address ranges may or may not be continuous, as described with reference to FIGS. 2 and 3. The mapping information 410 for a given file may include a path or ID in the block device that includes the backed-up data (e.g., MjfPath), an offset of the logical address range associated with the backed-up data, a size of the backed-up data (e.g., a range or quantity of bytes), or any combination thereof.

The data management system may thus obtain a snapshot, store the snapshot in a patch file in the cloud environment, and run an index job to determine which files and which logical address ranges the data blocks of the snapshot correspond to. By storing the mapping information 410 in a per-file block map in the metadata table 400, the data management system may retrieve the target address ranges for a requested file relatively quickly, and the data management system may use the target address ranges to perform a dry read of the cloud environment, as described in further detail elsewhere herein, including with reference to FIGS. 3 and 5.

Figure 5:
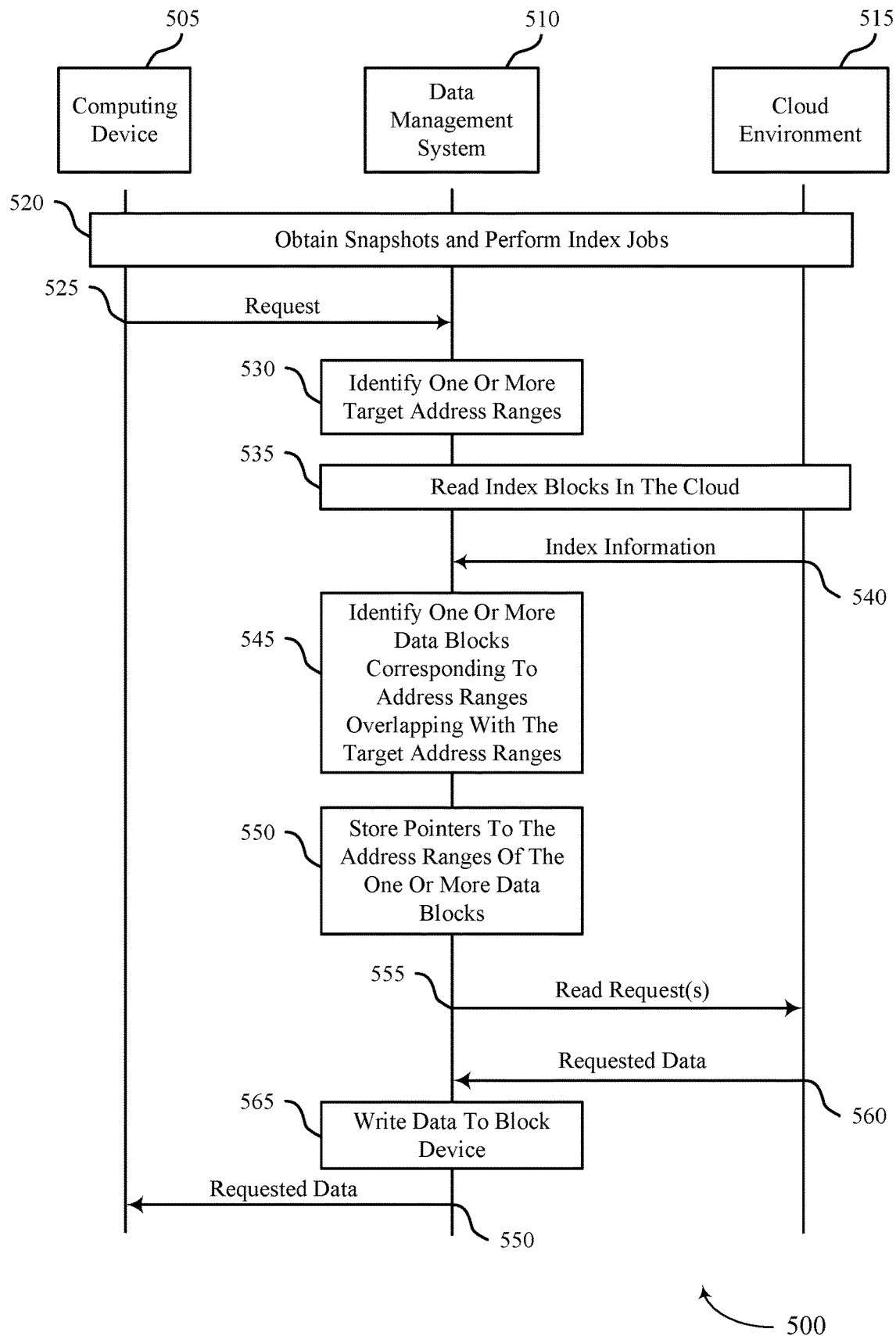
FIG. 5 illustrates an example of a process flow that supports multi-phase file recovery from cloud environments in accordance with aspects of the present disclosure.

FIG. 5 illustrates an example of a process flow 500 that supports multi-phase file recovery from cloud environments in accordance with aspects of the present disclosure. The process flow 500 may implement or be implemented by aspects of the computing environment 100, the patch file architecture 200, the block device architecture 300, and the metadata table 400 described with reference to FIGS. 1-4. For example, the process flow 500 may be implemented by a computing device 505, a data management system 510, and a cloud environment 515, which may each represent examples of corresponding components as described with reference to FIGS. 1-4. In some aspects, the computing device 505 may represent an example of a computing device 115 as described with reference to FIGS. 1 and 3, and the data management system 510 may represent an example of a data management system 110, as described with reference to FIG. 1. The process flow 500 may describe a method for the data management system 510 to read data from sparse files in the cloud environment 515 with relatively low latency and increased throughput, as described with reference to FIGS. 1-4.

In some aspects, the operations illustrated in the process flow 500 may be performed by hardware (e.g., including circuitry, processing blocks, logic components, and other components), code (e.g., software or firmware) executed by a processor, or any combination thereof. For example, aspects of the process flow 500 may be implemented or managed by a cloud data management service, a filesystem processing component, or some other software or application within a data management system 510 that is configured to manage backup and restoration of data and other computing resources within a cloud computing environment or other archive location. Alternative examples of the following may be implemented, where some steps are performed in a different order than described or are not performed at all. In some cases, steps may include additional features not mentioned below, or further steps may be added.

At 520, the data management system 510 may obtain one or more snapshots of a client filesystem. The filesystem may be running on the computing device 505 or in some other storage location. The filesystem may represent an example of a set of files including data for a client or user that operates the computing device 505, such as a virtual disk, or some other computing resource, as described with reference to FIGS. 1-4. The data management system 510 may store the snapshots in sparse files in the cloud environment 515. In some aspects, a sparse file may be associated with a respective snapshot. For example, the data management system 510 may obtain a first snapshot at a first time and a second snapshot at a second time that is after the first time. A first sparse file associated with (e.g., that stores data representative of) the first snapshot may include a first set of data blocks that represent the filesystem at the first time. A second sparse file associated with the second snapshot may include a second set of data blocks that represent data blocks from the filesystem at the second time that have changed since the first time (e.g., changed data blocks).

The data management system 510 may execute one or more index jobs for the snapshots. For example, each time a snapshot is obtained and/or stored in the cloud environment 515, the data management system 510 may execute a corresponding index job. To execute the index job for a snapshot, the data management system 510 may store mapping information for the snapshot that indicates logical address ranges corresponding to data blocks of the snapshot. The logical address ranges may be within a logical address space associated with the filesystem, as described with reference to FIG. 3. In some aspects, storing the mapping information may include generating or updating a block device, such as an MJF, to include the mapping information.

An index job may be further operable to update at least one entry in a metadata table for the filesystem to include the mapping information for the corresponding snapshot. The metadata table may represent an example of the metadata table 400 described with reference to FIG. 4 (e.g., an FMD). For example, entries in the metadata table may be indexed according to respective files in the filesystem and may include a path, an offset, a range, or any combination thereof of one or more logical address ranges corresponding to a respective file of the filesystem. As such, if the snapshot includes changed data blocks associated with two different files of the filesystem, both a first and second entry in the metadata table for a first and second file, respectively, of the two files may be updated to include the mapping information for the respective file.

At 525, the data management system 510 may receive, from the computing device 505, a request to read one or more files of the filesystem. In some aspects, the computing device 505 may provide a user interface for a client, and the client may select the one or more files via the user interface. In such cases, the read request may be based on the selection. The data of the filesystem may be stored across sparse files in the cloud environment 515 that each include a respective set of data blocks, as described herein.

At 530, the data management system 510 may identify, in response to the request to read the one or more files, one or more target address ranges corresponding to the one or more files of the filesystem. In some aspects, the data management system 510 may identify the one or more target address ranges based on the index jobs performed at 520. For example, the data management system 510 may identify, within the entries in the metadata table, one or more entries that are indexed by the one or more files indicated via the request. The data management system 510 may identify the one or more target address ranges based on logical address ranges that are included in the identified entries.

At 535, the data management system 510 may read a set of one or more index blocks for the sparse files in the cloud environment 515 based on the target address ranges corresponding to the one or more files requested via the read request. In some aspects, the data management system 510 may order the one or more target address ranges corresponding to the one or more files of the filesystem in an ascending or descending order, and reading the index blocks may be based on the ascending or descending order. An index block may include index information for a set of data blocks of a respective sparse file, and may be smaller than (e.g., include fewer bytes than) the set of data blocks, as described with reference to FIG. 2. In some aspects, reading the index blocks at 535 may be referred to as performing a dry read of the cloud environment 515.

At 540, the data management system may read or obtain the index information for the sparse files from the cloud environment 515 based on reading the one or more index blocks. The index information may indicate respective address ranges for data blocks within the sparse files.

At 545, the data management system 510 may identify one or more data blocks corresponding to address ranges that overlap with the one or more target address ranges corresponding to the one or more files of the filesystem based on the index information. At 550, the data management system 510 may store one or more pointers to the address ranges of the one or more data blocks based on identifying the data blocks. The data management system 510 may store the one or more pointers in a key-value store at the data management system 510, or in some other location that is accessible to the data management system 510. A key of the key-value store for a respective data block may include an offset of a target address range corresponding to the respective data block. A value of the key-value store for the respective data block may be a tuple value that may include an ID of a sparse file that includes the respective data block, an offset corresponding to the respective data block within the sparse file (e.g., a logical offset 225 described with reference to FIG. 2), and an address range corresponding to the respective data block within the sparse file.

At 555, the data management system 510 may generate and transmit, to the cloud environment 515, one or more read requests for the identified one or more data blocks within the one or more sparse files. In some aspects, the data management system 510 may order the pointers to the identified address ranges in an ascending or descending order in the key-value store. The data management system may read the key-value store in order (e.g., from start to finish) to determine which data blocks from the cloud environment 515 are indicated by the entries in the key-value store. In some aspects, the data management system 510 may utilize the pointers to coalesce read requests for multiple data blocks, to transmit read requests in parallel, or both. For example, The data management system 510 may determine, based on the ascending or descending order of the pointers in the key-value store, that address ranges of two or more data blocks of the one or more requested data blocks are contiguous within a same sparse file in the cloud environment 515. In such cases, the data management system 510 may generate a single read request for the two or more data blocks based on determining that the address ranges of the two or more data blocks are contiguous within the same sparse file. That is, the data management system 510 may coalesce or group read requests together to generate fewer read requests for larger ranges of data than if the data management system 510 did not identify and order the address ranges.

The data management system 510 may transmit the one or more read requests including the single read request for the two or more data blocks, one or more other individual or coalesced read requests, or both. In some aspects, the data management system 510 may transmit parallel read requests for the one or more data blocks based on the ascending or descending order. For example, the data management system 510 may transmit a first read request for a first address range at a first time and a second read request for a second address range that is subsequent to the first address range in the order at a second time. The cloud environment 515 may process the read requests in order, and the cloud environment 515 may still be processing the first read request at the second time at which the second read request is transmitted, which may be referred to as parallel read request transmissions.

At 560, the cloud environment 515 may provide the requested data to the data management system 510 based on the one or more read requests. The data management system 510 may thus obtain the identified one or more data blocks from the sparse files in the cloud environment 515. At 565, the data management system 510 may write the one or more data blocks to a block device (e.g., a journal file within the block device) at the data management system 510. The data management system 510 may generate the block device or update an existing block device to write the data into the journal file. The journal file and the block device may represent examples of corresponding elements or components, as described with reference to FIG. 3.

At 550, the data management system 510 may provide the requested data to the computing device 505. In some aspects, to provide the requested data to the computing device 505, the data management system 510 may mount the client's filesystem on the block device at the data management system 510, and the data management system 510 may instantiate the one or more data blocks received from the cloud environment 515 via the mounted filesystem based on the request. The computing device 505 may thus access the one or more data blocks associated with the one or more files requested via the request using the mount. Additionally or alternatively, the data management system 510 may transfer the data blocks to the computing device 505, such that the requested one or more files may be recovered or restored at the computing device 505 based on the data blocks.

The data management system 510 described herein may thus process a read request from a computing device 505 and obtain the requested data from a cloud environment 515 in one or more phases to reduce latency and improve throughput of the read operation. By identifying target address ranges and corresponding address ranges in the cloud environment 515 for each requested file, the data management system 510 may intelligently coalesce or order one or more read requests for the data, which may reduce redundancy, reduce latency, and improve throughput of the communications.

Figure 6:
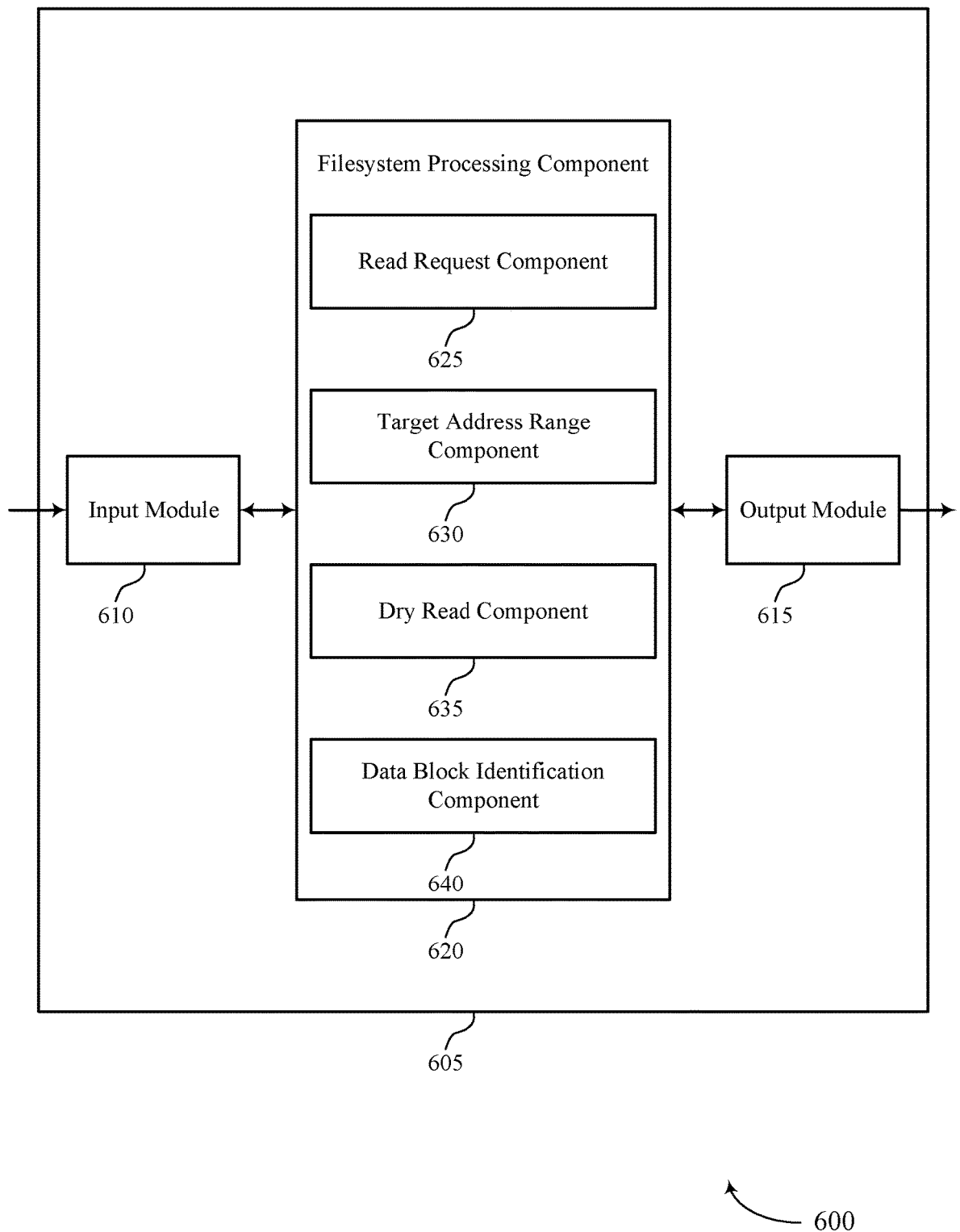
FIG. 6 shows a block diagram of an apparatus that supports multi-phase file recovery from cloud environments in accordance with aspects of the present disclosure.

FIG. 6 shows a block diagram 600 of a device 605 that supports multi-phase file recovery from cloud environments in accordance with aspects of the present disclosure. The device 605 may include an input module 610, an output module 615, and a filesystem processing component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the filesystem processing component 620 to support multi-phase file recovery from cloud environments. In some cases, the input module 610 may be a component of a network interface 810 as described with reference to FIG. 8.

The output module 615 may manage output signals for the device 605. For example, the output module 615 may receive signals from other components of the device 605, such as the filesystem processing component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the filesystem processing component 620 may include a read request component 625, a target address range component 630, a dry read component 635, a data block identification component 640, or any combination thereof. In some examples, the filesystem processing component 620, or various components thereof, may be configured to perform various operations (e.g., receiving, monitoring, transmitting) using or otherwise in cooperation with the input module 610, the output module 615, or both. For example, the filesystem processing component 620 may receive information from the input module 610, send information to the output module 615, or be integrated in combination with the input module 610, the output module 615, or both to receive information, transmit information, or perform various other operations as described herein.

The read request component 625 may be configured as or otherwise support a means for receiving a request to read one or more files of a filesystem, where data of the filesystem is stored across a set of multiple sparse files in a cloud environment, the set of multiple sparse files including respective sets of data blocks. The target address range component 630 may be configured as or otherwise support a means for identifying, in response to the request to read the one or more files, one or more target address ranges corresponding to the one or more files of the filesystem. The dry read component 635 may be configured as or otherwise support a means for reading, from the cloud environment, index information for the set of multiple sparse files, where the index information indicates respective address ranges for data blocks within the set of multiple sparse files. The data block identification component 640 may be configured as or otherwise support a means for identifying, based on reading the index information, one or more data blocks within one or more sparse files of the set of multiple sparse files as corresponding to address ranges that overlap with the one or more target address ranges corresponding to the one or more files of the filesystem. The read request component 625 may be configured as or otherwise support a means for transmitting, to the cloud environment, one or more read requests for the identified one or more data blocks within the one or more sparse files.

Figure 7:
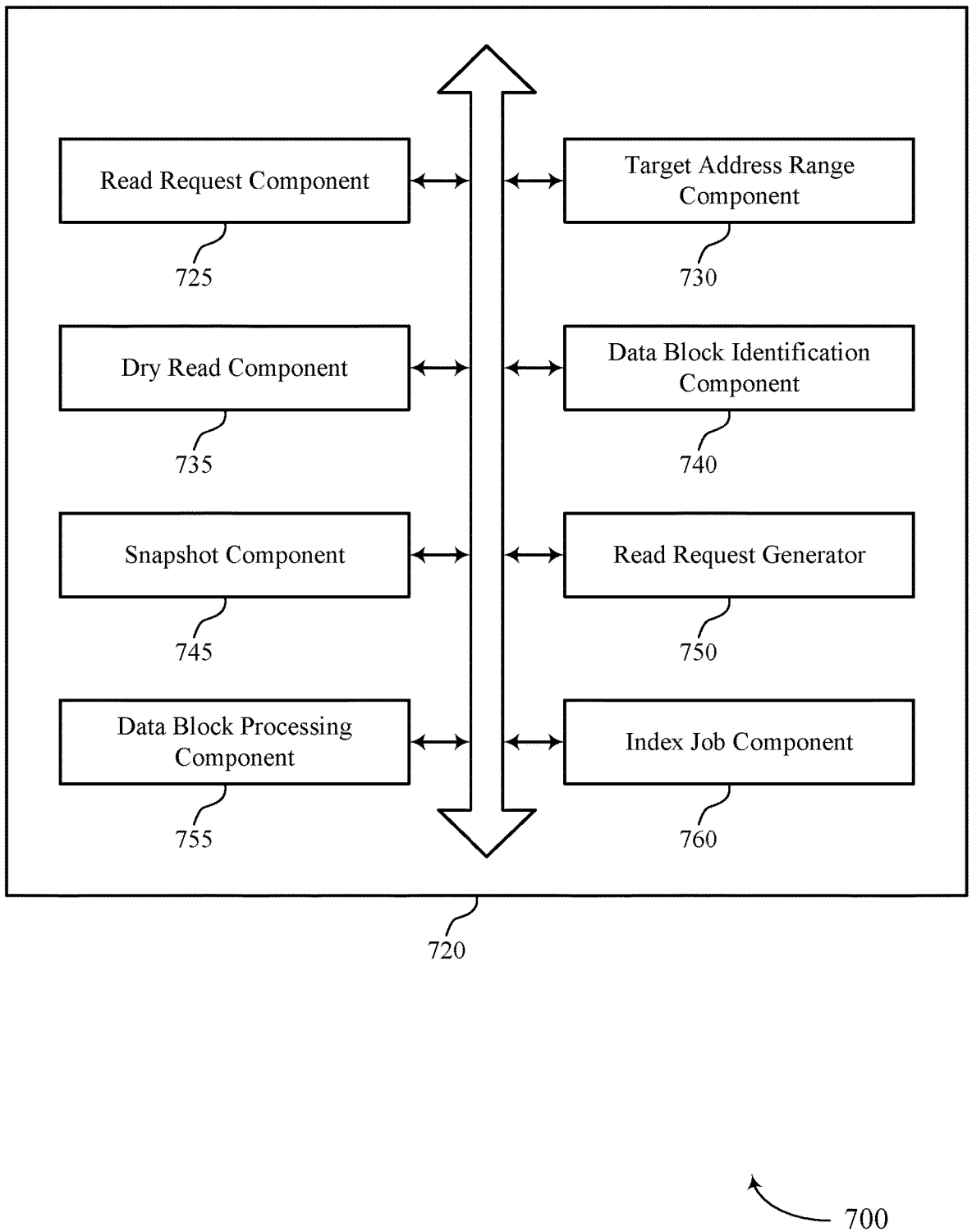
FIG. 7 shows a block diagram of a filesystem processing component that supports multi-phase file recovery from cloud environments in accordance with aspects of the present disclosure.

FIG. 7 shows a block diagram 700 of a filesystem processing component 720 that supports multi-phase file recovery from cloud environments in accordance with aspects of the present disclosure. The filesystem processing component 720 may be an example of aspects of a filesystem processing component or a filesystem processing component 620, or both, as described herein. The filesystem processing component 720, or various components thereof, may be an example of means for performing various aspects of multi-phase file recovery from cloud environments as described herein. For example, the filesystem processing component 720 may include a read request component 725, a target address range component 730, a dry read component 735, a data block identification component 740, a snapshot component 745, a read request generator 750, a data block processing component 755, an index job component 760, or any combination thereof. Each of these components may communicate, directly or indirectly, with one another (e.g., via one or more buses).

The read request component 725 may be configured as or otherwise support a means for receiving a request to read one or more files of a filesystem, where data of the filesystem is stored across a set of multiple sparse files in a cloud environment, the set of multiple sparse files including respective sets of data blocks. The target address range component 730 may be configured as or otherwise support a means for identifying, in response to the request to read the one or more files, one or more target address ranges corresponding to the one or more files of the filesystem. The dry read component 735 may be configured as or otherwise support a means for reading, from the cloud environment, index information for the set of multiple sparse files, where the index information indicates respective address ranges for data blocks within the set of multiple sparse files. The data block identification component 740 may be configured as or otherwise support a means for identifying, based on reading the index information, one or more data blocks within one or more sparse files of the set of multiple sparse files as corresponding to address ranges that overlap with the one or more target address ranges corresponding to the one or more files of the filesystem. In some examples, the read request component 725 may be configured as or otherwise support a means for transmitting, to the cloud environment, one or more read requests for the identified one or more data blocks within the one or more sparse files.

In some examples, the snapshot component 745 may be configured as or otherwise support a means for obtaining snapshots of the filesystem, the snapshots including at least a first snapshot at a first time and a second snapshot at a second time that is after the first time. In some examples, the snapshot component 745 may be configured as or otherwise support a means for storing the snapshots in in the cloud environment, where the snapshots include the set of multiple sparse files, and where a first sparse file associated with the first snapshot includes a first set of data blocks that represent the filesystem at the first time and a second sparse file associated with the second snapshot includes a second set of data blocks that represent data blocks from the filesystem at the second time that have changed since the first time.

In some examples, the index job component 760 may be configured as or otherwise support a means for executing respective index jobs for the snapshots, where executing an index job of the respective index jobs for a snapshot of the snapshots includes. In some examples, the index job component 760 may be configured as or otherwise support a means for storing respective mapping information for the snapshot that indicates respective logical address ranges corresponding to data blocks of the snapshot, the respective logical address ranges within a logical address space associated with the filesystem. In some examples, the index job component 760 may be configured as or otherwise support a means for updating at least one entry in a metadata table for the filesystem to include the respective mapping information for the snapshot, where entries in the metadata table are indexed according to respective files of the filesystem.

In some examples, the target address range component 730 may be configured as or otherwise support a means for identifying, within the entries in the metadata table, one or more entries in the metadata table that are indexed by the one or more files indicated via the request, where identifying the one or more target address ranges is based on logical address ranges in the one or more entries in the metadata table.

In some examples, an entry of the entries in the metadata table includes a path, an offset, a range, or any combination thereof of one or more logical address ranges corresponding to a respective file of the filesystem.

In some examples, the data block identification component 740 may be configured as or otherwise support a means for storing, based on identifying the one or more data blocks, one or more pointers to the address ranges of the one or more data blocks that overlap with the one or more target address ranges.

In some examples, the one or more pointers are stored in a key-value store at a data management system. In some examples, a key of the key-value store for a respective data block includes an offset of a target address range corresponding to the respective data block. In some examples, a value of the key-value store for the respective data block includes an identifier of a sparse file that includes the respective data block, an offset corresponding to the respective data block within the sparse file, and an address range corresponding to the respective data block within the sparse file.

In some examples, to support reading the index information, the dry read component 735 may be configured as or otherwise support a means for reading a set of multiple index blocks for the set of multiple sparse files in the cloud environment based on the one or more target address ranges corresponding to the one or more files, where an index block of the set of multiple index blocks includes the index information for a set of data blocks of a respective sparse file of the set of multiple sparse files.

In some examples, the dry read component 735 may be configured as or otherwise support a means for ordering the one or more target address ranges corresponding to the one or more files of the filesystem in an ascending or descending order, where reading the set of multiple index blocks is based on the ordering of the one or more target address ranges.

In some examples, a first quantity of bytes in the index block is less than a second quantity of bytes in the set of data blocks.

In some examples, the read request generator 750 may be configured as or otherwise support a means for determining that address ranges of at least two data blocks of the one or more data blocks are contiguous within a same sparse file of the set of multiple sparse files in the cloud environment. In some examples, the read request generator 750 may be configured as or otherwise support a means for generating a single read request for the at least two data blocks based on determining that the address ranges of the at least two data blocks are contiguous within the same sparse file, the one or more read requests including at least the single read request.

In some examples, the read request generator 750 may be configured as or otherwise support a means for ordering the address ranges of the one or more data blocks in an ascending or descending order, where transmitting the one or more read requests includes transmitting parallel read requests for the one or more data blocks based on the ascending or descending order.

In some examples, the data block processing component 755 may be configured as or otherwise support a means for obtaining the identified one or more data blocks from the one or more sparse files based on the one or more read requests. In some examples, the data block processing component 755 may be configured as or otherwise support a means for writing the one or more data blocks to a journal file within a block device at a data management system.

In some examples, the data block processing component 755 may be configured as or otherwise support a means for mounting the filesystem on the block device at the data management system. In some examples, the data block processing component 755 may be configured as or otherwise support a means for instantiating the one or more data blocks via the mounted filesystem based on the request, the one or more data blocks corresponding to the one or more files requested via the request.

Figure 8:
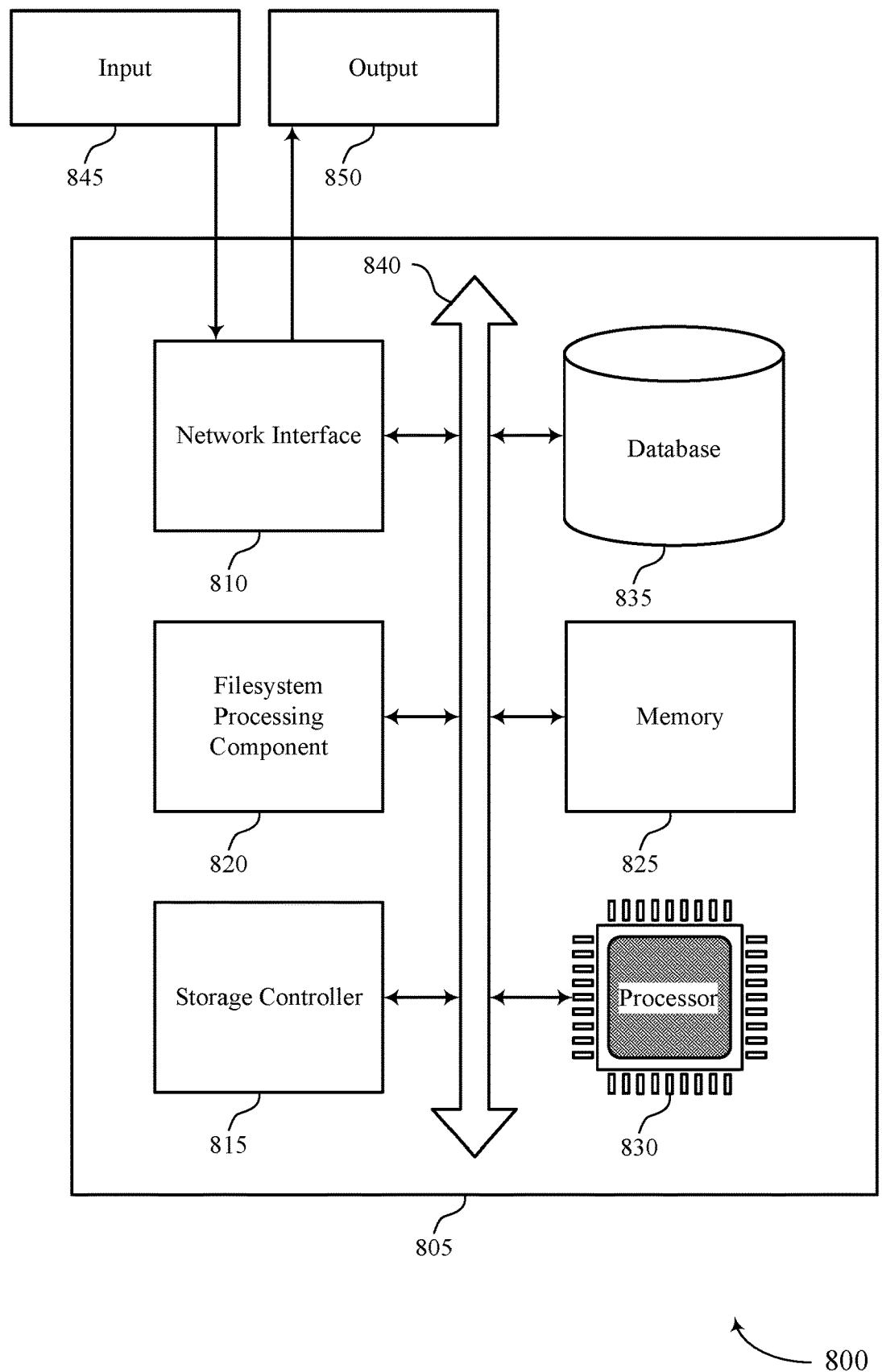
FIG. 8 shows a diagram of a system including a device that supports multi-phase file recovery from cloud environments in accordance with aspects of the present disclosure.

FIG. 8 shows a diagram of a system 800 including a device 805 that supports multi-phase file recovery from cloud environments in accordance with aspects of the present disclosure. The device 805 may be an example of or include the components of a device 605 as described herein. The device 805 may include components for bi-directional data communications including components for transmitting and receiving communications, such as a filesystem processing component 820, a network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The network interface 810 may manage input signals 845 and output signals 850 for the device 805. The network interface 810 may also manage peripherals not integrated into the device 805. In some cases, the network interface 810 may represent a physical connection or port to an external peripheral. In some cases, the network interface 810 may utilize an operating system such as iOS®, ANDROID®, MS-DOS®, MS-WINDOWS®, OS/2®, UNIX®, LINUX®, or another known operating system. In other cases, the network interface 810 may represent or interact with a modem, a keyboard, a mouse, a touchscreen, or a similar device. In some cases, the network interface 810 may be implemented as part of a processor 830. In some examples, a user may interact with the device 805 via the network interface 810 or via hardware components controlled by the network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting multi-phase file recovery from cloud environments).

For example, the filesystem processing component 820 may be configured as or otherwise support a means for receiving a request to read one or more files of a filesystem, where data of the filesystem is stored across a set of multiple sparse files in a cloud environment, the set of multiple sparse files including respective sets of data blocks. The filesystem processing component 820 may be configured as or otherwise support a means for identifying, in response to the request to read the one or more files, one or more target address ranges corresponding to the one or more files of the filesystem. The filesystem processing component 820 may be configured as or otherwise support a means for reading, from the cloud environment, index information for the set of multiple sparse files, where the index information indicates respective address ranges for data blocks within the set of multiple sparse files. The filesystem processing component 820 may be configured as or otherwise support a means for identifying, based on reading the index information, one or more data blocks within one or more sparse files of the set of multiple sparse files as corresponding to address ranges that overlap with the one or more target address ranges corresponding to the one or more files of the filesystem. The filesystem processing component 820 may be configured as or otherwise support a means for transmitting, to the cloud environment, one or more read requests for the identified one or more data blocks within the one or more sparse files.

By including or configuring the filesystem processing component 820 in accordance with examples as described herein, the device 805 may support techniques for reduced latency and overhead for reading data from a cloud environment. For example, read requests may be coalesced or sent in parallel to a cloud environment, which may reduce processing in the cloud, improve throughput of the data transmissions, and reduce overall latency associated with receiving the data from the cloud. The device 805 may additionally or alternatively support improved reliability and security associated with reading, recovering, and/or restoring data from a cloud environment, and more efficient utilization of communication resources.

Figure 9:
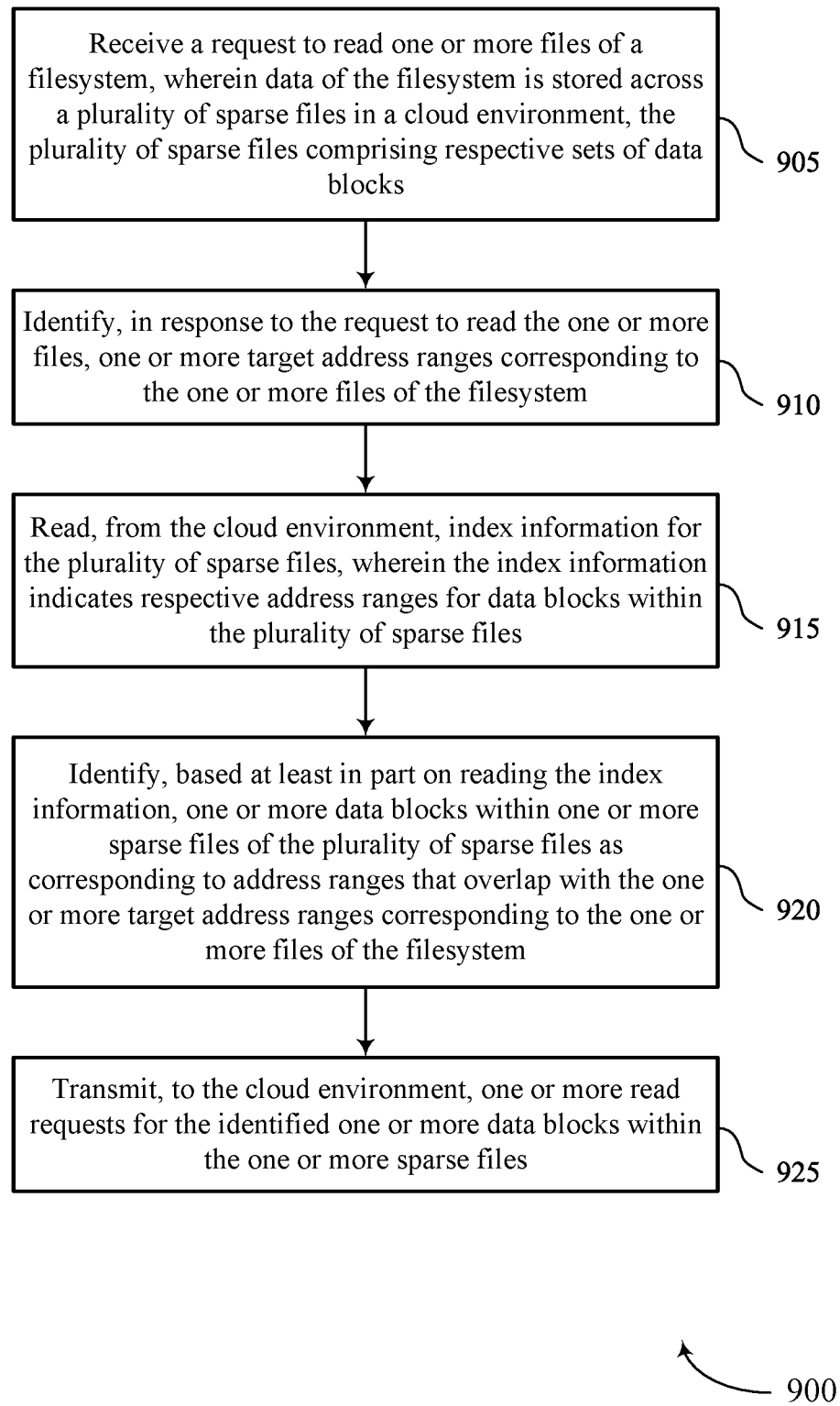
FIG. 9 through 12 show flowcharts illustrating methods that support multi-phase file recovery from cloud environments in accordance with aspects of the present disclosure.

FIG. 9 shows a flowchart illustrating a method 900 that supports multi-phase file recovery from cloud environments in accordance with aspects of the present disclosure. The operations of the method 900 may be implemented by a data management system or its components as described herein. For example, the operations of the method 900 may be performed by a data management system as described with reference to FIGS. 1 through 8. In some examples, a data management system may execute a set of instructions to control the functional elements of the data management system to perform the described functions. Additionally, or alternatively, the data management system may perform aspects of the described functions using special-purpose hardware.

At 905, the method may include receiving a request to read one or more files of a filesystem, where data of the filesystem is stored across a set of multiple sparse files in a cloud environment, the set of multiple sparse files including respective sets of data blocks. The operations of 905 may be performed in accordance with examples as disclosed herein. In some examples, aspects of the operations of 905 may be performed by a read request component 725 as described with reference to FIG. 7.

At 910, the method may include identifying, in response to the request to read the one or more files, one or more target address ranges corresponding to the one or more files of the filesystem. The operations of 910 may be performed in accordance with examples as disclosed herein. In some examples, aspects of the operations of 910 may be performed by a target address range component 730 as described with reference to FIG. 7.

At 915, the method may include reading, from the cloud environment, index information for the set of multiple sparse files, where the index information indicates respective address ranges for data blocks within the set of multiple sparse files. The operations of 915 may be performed in accordance with examples as disclosed herein. In some examples, aspects of the operations of 915 may be performed by a dry read component 735 as described with reference to FIG. 7.

At 920, the method may include identifying, based on reading the index information, one or more data blocks within one or more sparse files of the set of multiple sparse files as corresponding to address ranges that overlap with the one or more target address ranges corresponding to the one or more files of the filesystem. The operations of 920 may be performed in accordance with examples as disclosed herein. In some examples, aspects of the operations of 920 may be performed by a data block identification component 740 as described with reference to FIG. 7.

At 925, the method may include transmitting, to the cloud environment, one or more read requests for the identified one or more data blocks within the one or more sparse files. The operations of 925 may be performed in accordance with examples as disclosed herein. In some examples, aspects of the operations of 925 may be performed by a read request component 725 as described with reference to FIG. 7.

Figure 10:
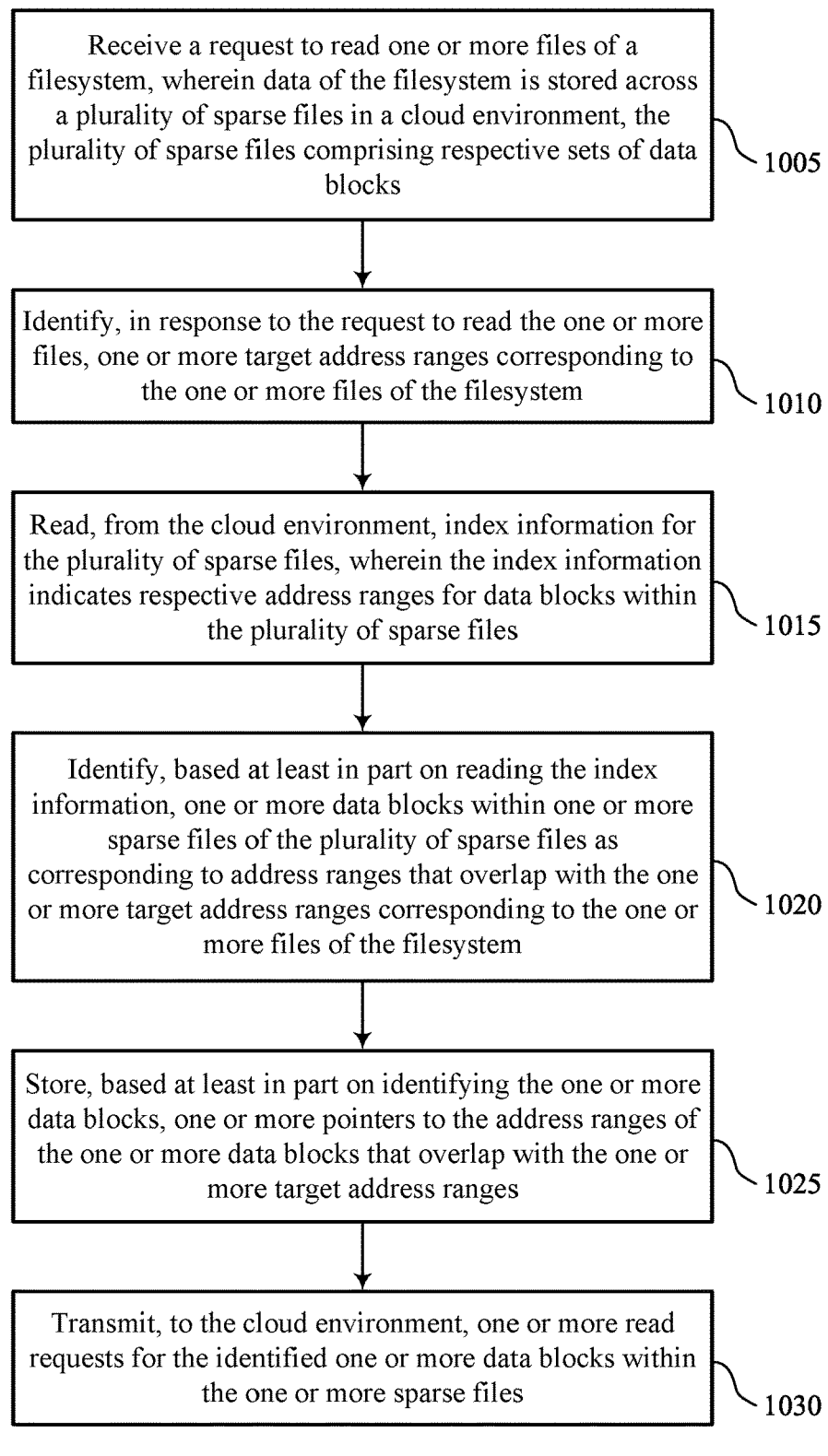

FIG. 10 shows a flowchart illustrating a method 1000 that supports multi-phase file recovery from cloud environments in accordance with aspects of the present disclosure. The operations of the method 1000 may be implemented by a data management system or its components as described herein. For example, the operations of the method 1000 may be performed by a data management system as described with reference to FIGS. 1 through 8. In some examples, a data management system may execute a set of instructions to control the functional elements of the data management system to perform the described functions. Additionally, or alternatively, the data management system may perform aspects of the described functions using special-purpose hardware.

At 1005, the method may include receiving a request to read one or more files of a filesystem, where data of the filesystem is stored across a set of multiple sparse files in a cloud environment, the set of multiple sparse files including respective sets of data blocks. The operations of 1005 may be performed in accordance with examples as disclosed herein. In some examples, aspects of the operations of 1005 may be performed by a read request component 725 as described with reference to FIG. 7.

At 1010, the method may include identifying, in response to the request to read the one or more files, one or more target address ranges corresponding to the one or more files of the filesystem. The operations of 1010 may be performed in accordance with examples as disclosed herein. In some examples, aspects of the operations of 1010 may be performed by a target address range component 730 as described with reference to FIG. 7.

At 1015, the method may include reading, from the cloud environment, index information for the set of multiple sparse files, where the index information indicates respective address ranges for data blocks within the set of multiple sparse files. The operations of 1015 may be performed in accordance with examples as disclosed herein. In some examples, aspects of the operations of 1015 may be performed by a dry read component 735 as described with reference to FIG. 7.

At 1020, the method may include identifying, based on reading the index information, one or more data blocks within one or more sparse files of the set of multiple sparse files as corresponding to address ranges that overlap with the one or more target address ranges corresponding to the one or more files of the filesystem. The operations of 1020 may be performed in accordance with examples as disclosed herein. In some examples, aspects of the operations of 1020 may be performed by a data block identification component 740 as described with reference to FIG. 7.

At 1025, the method may include storing, based on identifying the one or more data blocks, one or more pointers to the address ranges of the one or more data blocks that overlap with the one or more target address ranges. The operations of 1025 may be performed in accordance with examples as disclosed herein. In some examples, aspects of the operations of 1025 may be performed by a data block identification component 740 as described with reference to FIG. 7.

At 1030, the method may include transmitting, to the cloud environment, one or more read requests for the identified one or more data blocks within the one or more sparse files. The operations of 1030 may be performed in accordance with examples as disclosed herein. In some examples, aspects of the operations of 1030 may be performed by a read request component 725 as described with reference to FIG. 7.

Figure 11:
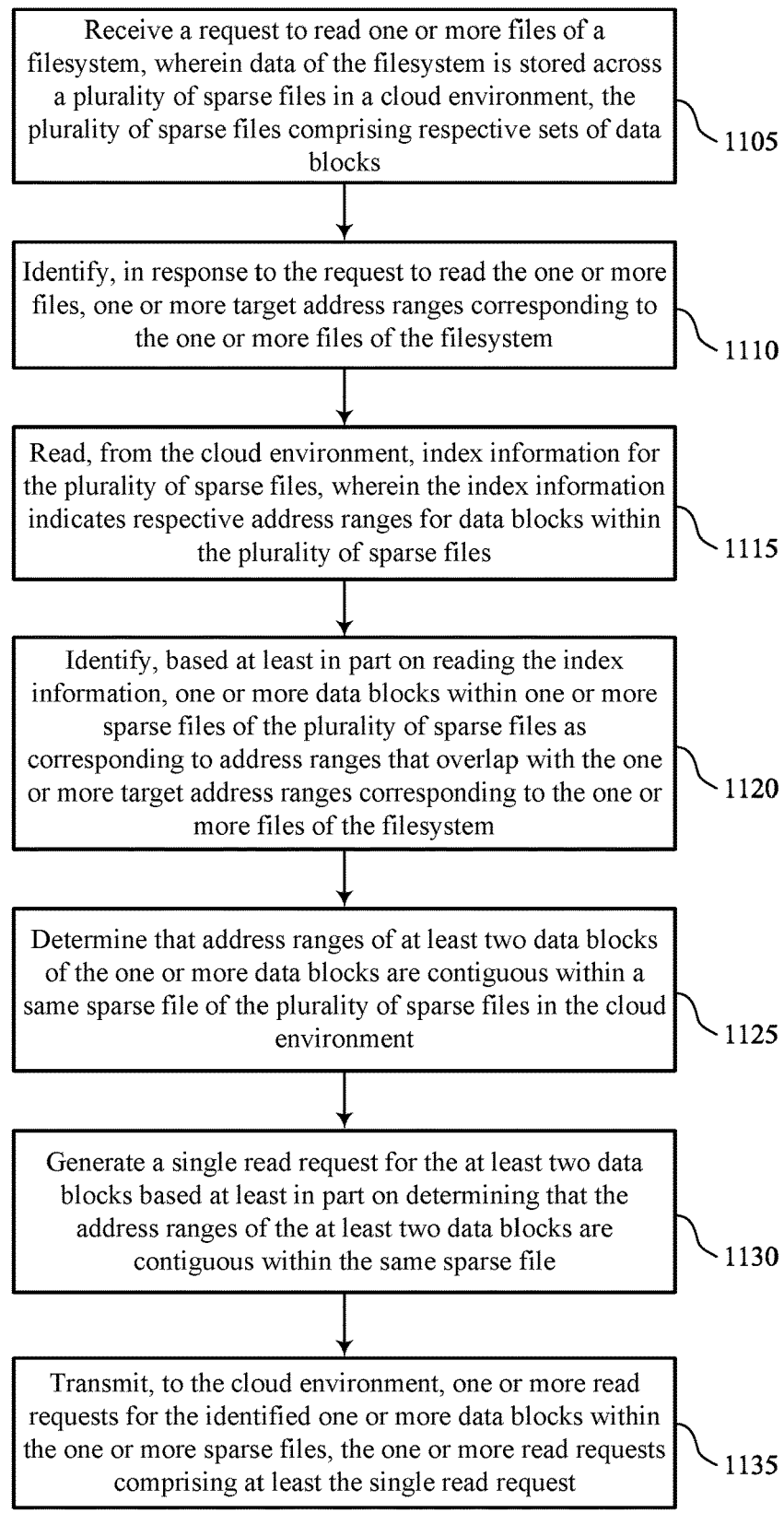

FIG. 11 shows a flowchart illustrating a method 1100 that supports multi-phase file recovery from cloud environments in accordance with aspects of the present disclosure. The operations of the method 1100 may be implemented by a data management system or its components as described herein. For example, the operations of the method 1100 may be performed by a data management system as described with reference to FIGS. 1 through 8. In some examples, a data management system may execute a set of instructions to control the functional elements of the data management system to perform the described functions. Additionally, or alternatively, the data management system may perform aspects of the described functions using special-purpose hardware.

At 1105, the method may include receiving a request to read one or more files of a filesystem, where data of the filesystem is stored across a set of multiple sparse files in a cloud environment, the set of multiple sparse files including respective sets of data blocks. The operations of 1105 may be performed in accordance with examples as disclosed herein. In some examples, aspects of the operations of 1105 may be performed by a read request component 725 as described with reference to FIG. 7.

At 1110, the method may include identifying, in response to the request to read the one or more files, one or more target address ranges corresponding to the one or more files of the filesystem. The operations of 1110 may be performed in accordance with examples as disclosed herein. In some examples, aspects of the operations of 1110 may be performed by a target address range component 730 as described with reference to FIG. 7.

At 1115, the method may include reading, from the cloud environment, index information for the set of multiple sparse files, where the index information indicates respective address ranges for data blocks within the set of multiple sparse files. The operations of 1115 may be performed in accordance with examples as disclosed herein. In some examples, aspects of the operations of 1115 may be performed by a dry read component 735 as described with reference to FIG. 7.

At 1120, the method may include identifying, based on reading the index information, one or more data blocks within one or more sparse files of the set of multiple sparse files as corresponding to address ranges that overlap with the one or more target address ranges corresponding to the one or more files of the filesystem. The operations of 1120 may be performed in accordance with examples as disclosed herein. In some examples, aspects of the operations of 1120 may be performed by a data block identification component 740 as described with reference to FIG. 7.

At 1125, the method may include determining that address ranges of at least two data blocks of the one or more data blocks are contiguous within a same sparse file of the set of multiple sparse files in the cloud environment. The operations of 1125 may be performed in accordance with examples as disclosed herein. In some examples, aspects of the operations of 1125 may be performed by a read request generator 750 as described with reference to FIG. 7.

At 1130, the method may include generating a single read request for the at least two data blocks based on determining that the address ranges of the at least two data blocks are contiguous within the same sparse file. The operations of 1130 may be performed in accordance with examples as disclosed herein. In some examples, aspects of the operations of 1130 may be performed by a read request generator 750 as described with reference to FIG. 7.

At 1135, the method may include transmitting, to the cloud environment, one or more read requests for the identified one or more data blocks within the one or more sparse files, the one or more read requests including at least the single read request. The operations of 1135 may be performed in accordance with examples as disclosed herein. In some examples, aspects of the operations of 1135 may be performed by a read request component 725 as described with reference to FIG. 7.

Figure 12:
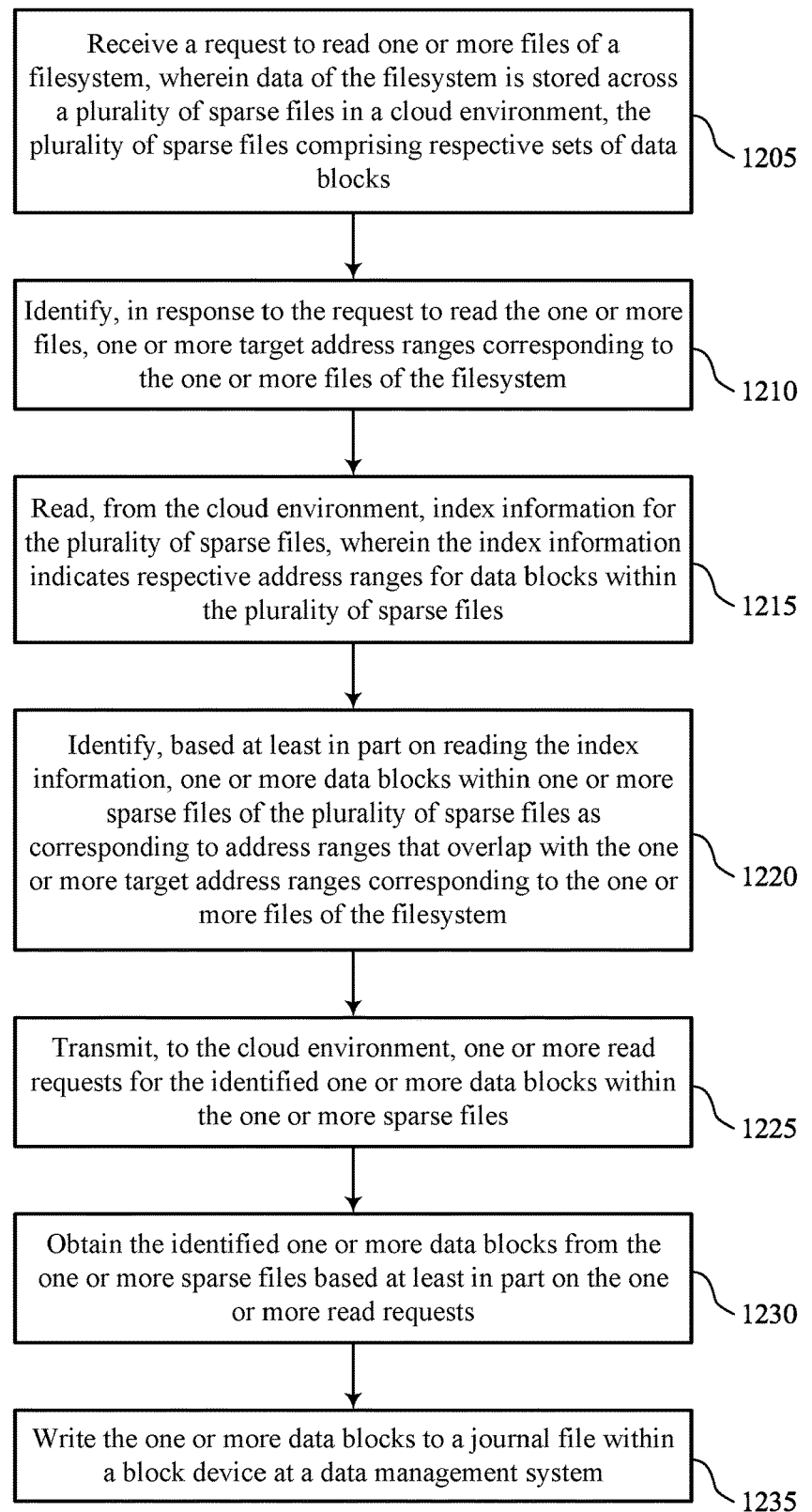

FIG. 12 shows a flowchart illustrating a method 1200 that supports multi-phase file recovery from cloud environments in accordance with aspects of the present disclosure. The operations of the method 1200 may be implemented by a data management system or its components as described herein. For example, the operations of the method 1200 may be performed by a data management system as described with reference to FIGS. 1 through 8. In some examples, a data management system may execute a set of instructions to control the functional elements of the data management system to perform the described functions. Additionally, or alternatively, the data management system may perform aspects of the described functions using special-purpose hardware.

At 1205, the method may include receiving a request to read one or more files of a filesystem, where data of the filesystem is stored across a set of multiple sparse files in a cloud environment, the set of multiple sparse files including respective sets of data blocks. The operations of 1205 may be performed in accordance with examples as disclosed herein. In some examples, aspects of the operations of 1205 may be performed by a read request component 725 as described with reference to FIG. 7.

At 1210, the method may include identifying, in response to the request to read the one or more files, one or more target address ranges corresponding to the one or more files of the filesystem. The operations of 1210 may be performed in accordance with examples as disclosed herein. In some examples, aspects of the operations of 1210 may be performed by a target address range component 730 as described with reference to FIG. 7.

At 1215, the method may include reading, from the cloud environment, index information for the set of multiple sparse files, where the index information indicates respective address ranges for data blocks within the set of multiple sparse files. The operations of 1215 may be performed in accordance with examples as disclosed herein. In some examples, aspects of the operations of 1215 may be performed by a dry read component 735 as described with reference to FIG. 7.

At 1220, the method may include identifying, based on reading the index information, one or more data blocks within one or more sparse files of the set of multiple sparse files as corresponding to address ranges that overlap with the one or more target address ranges corresponding to the one or more files of the filesystem. The operations of 1220 may be performed in accordance with examples as disclosed herein. In some examples, aspects of the operations of 1220 may be performed by a data block identification component 740 as described with reference to FIG. 7.

At 1225, the method may include transmitting, to the cloud environment, one or more read requests for the identified one or more data blocks within the one or more sparse files. The operations of 1225 may be performed in accordance with examples as disclosed herein. In some examples, aspects of the operations of 1225 may be performed by a read request component 725 as described with reference to FIG. 7.

At 1230, the method may include obtaining the identified one or more data blocks from the one or more sparse files based on the one or more read requests. The operations of 1230 may be performed in accordance with examples as disclosed herein. In some examples, aspects of the operations of 1230 may be performed by a data block processing component 755 as described with reference to FIG. 7.

At 1235, the method may include writing the one or more data blocks to a journal file within a block device at a data management system. The operations of 1235 may be performed in accordance with examples as disclosed herein. In some examples, aspects of the operations of 1235 may be performed by a data block processing component 755 as described with reference to FIG. 7.

A method is described. The method may include receiving a request to read one or more files of a filesystem, where data of the filesystem is stored across a set of multiple sparse files in a cloud environment, the set of multiple sparse files including respective sets of data blocks, identifying, in response to the request to read the one or more files, one or more target address ranges corresponding to the one or more files of the filesystem, reading, from the cloud environment, index information for the set of multiple sparse files, where the index information indicates respective address ranges for data blocks within the set of multiple sparse files, identifying, based on reading the index information, one or more data blocks within one or more sparse files of the set of multiple sparse files as corresponding to address ranges that overlap with the one or more target address ranges corresponding to the one or more files of the filesystem, and transmitting, to the cloud environment, one or more read requests for the identified one or more data blocks within the one or more sparse files.

An apparatus is described. The apparatus may include at least one processor, memory coupled with the at least one processor, and instructions stored in the memory. The instructions may be executable by the at least one processor to cause the apparatus to receive a request to read one or more files of a filesystem, where data of the filesystem is stored across a set of multiple sparse files in a cloud environment, the set of multiple sparse files including respective sets of data blocks, identify, in response to the request to read the one or more files, one or more target address ranges corresponding to the one or more files of the filesystem, read, from the cloud environment, index information for the set of multiple sparse files, where the index information indicates respective address ranges for data blocks within the set of multiple sparse files, identify, based on reading the index information, one or more data blocks within one or more sparse files of the set of multiple sparse files as corresponding to address ranges that overlap with the one or more target address ranges corresponding to the one or more files of the filesystem, and transmit, to the cloud environment, one or more read requests for the identified one or more data blocks within the one or more sparse files.

Another apparatus is described. The apparatus may include means for receiving a request to read one or more files of a filesystem, where data of the filesystem is stored across a set of multiple sparse files in a cloud environment, the set of multiple sparse files including respective sets of data blocks, means for identifying, in response to the request to read the one or more files, one or more target address ranges corresponding to the one or more files of the filesystem, means for reading, from the cloud environment, index information for the set of multiple sparse files, where the index information indicates respective address ranges for data blocks within the set of multiple sparse files, means for identifying, based on reading the index information, one or more data blocks within one or more sparse files of the set of multiple sparse files as corresponding to address ranges that overlap with the one or more target address ranges corresponding to the one or more files of the filesystem, and means for transmitting, to the cloud environment, one or more read requests for the identified one or more data blocks within the one or more sparse files.

A non-transitory computer-readable medium storing code is described. The code may include instructions executable by at least one processor to receive a request to read one or more files of a filesystem, where data of the filesystem is stored across a set of multiple sparse files in a cloud environment, the set of multiple sparse files including respective sets of data blocks, identify, in response to the request to read the one or more files, one or more target address ranges corresponding to the one or more files of the filesystem, read, from the cloud environment, index information for the set of multiple sparse files, where the index information indicates respective address ranges for data blocks within the set of multiple sparse files, identify, based on reading the index information, one or more data blocks within one or more sparse files of the set of multiple sparse files as corresponding to address ranges that overlap with the one or more target address ranges corresponding to the one or more files of the filesystem, and transmit, to the cloud environment, one or more read requests for the identified one or more data blocks within the one or more sparse files.

Some examples of the method, apparatuses, and non-transitory computer-readable medium described herein may further include operations, features, means, or instructions for obtaining snapshots of the filesystem, the snapshots including at least a first snapshot at a first time and a second snapshot at a second time that may be after the first time, and storing the snapshots in in the cloud environment, where the snapshots include the set of multiple sparse files, and where a first sparse file associated with the first snapshot includes a first set of data blocks that represent the filesystem at the first time and a second sparse file associated with the second snapshot includes a second set of data blocks that represent data blocks from the filesystem at the second time that may have changed since the first time.

Some examples of the method, apparatuses, and non-transitory computer-readable medium described herein may further include operations, features, means, or instructions for executing respective index jobs for the snapshots. In some examples, operations features, means, or instructions for executing an index job of the respective index jobs for a snapshot of the snapshots may include operations features, means, or instructions for storing respective mapping information for the snapshot that indicates respective logical address ranges corresponding to data blocks of the snapshot, the respective logical address ranges within a logical address space associated with the filesystem, and updating at least one entry in a metadata table for the filesystem to include the respective mapping information for the snapshot, where entries in the metadata table may be indexed according to respective files of the filesystem.

Some examples of the method, apparatuses, and non-transitory computer-readable medium described herein may further include operations, features, means, or instructions for identifying, within the entries in the metadata table, one or more entries in the metadata table that may be indexed by the one or more files indicated via the request, where identifying the one or more target address ranges may be based on logical address ranges in the one or more entries in the metadata table.

In some examples of the method, apparatuses, and non-transitory computer-readable medium described herein, an entry of the entries in the metadata table includes a path, an offset, a range, or any combination thereof of one or more logical address ranges corresponding to a respective file of the filesystem.

Some examples of the method, apparatuses, and non-transitory computer-readable medium described herein may further include operations, features, means, or instructions for storing, based on identifying the one or more data blocks, one or more pointers to the address ranges of the one or more data blocks that overlap with the one or more target address ranges.

In some examples of the method, apparatuses, and non-transitory computer-readable medium described herein, the one or more pointers may be stored in a key-value store at a data management system, a key of the key-value store for a respective data block includes an offset of a target address range corresponding to the respective data block, and a value of the key-value store for the respective data block includes an identifier of a sparse file that includes the respective data block, an offset corresponding to the respective data block within the sparse file, and an address range corresponding to the respective data block within the sparse file.

In some examples of the method, apparatuses, and non-transitory computer-readable medium described herein, reading the index information may include operations, features, means, or instructions for reading a set of multiple index blocks for the set of multiple sparse files in the cloud environment based on the one or more target address ranges corresponding to the one or more files, where an index block of the set of multiple index blocks includes the index information for a set of data blocks of a respective sparse file of the set of multiple sparse files.

Some examples of the method, apparatuses, and non-transitory computer-readable medium described herein may further include operations, features, means, or instructions for ordering the one or more target address ranges corresponding to the one or more files of the filesystem in an ascending or descending order, where reading the set of multiple index blocks may be based on the ordering of the one or more target address ranges.

In some examples of the method, apparatuses, and non-transitory computer-readable medium described herein, a first quantity of bytes in the index block may be less than a second quantity of bytes in the set of data blocks.

Some examples of the method, apparatuses, and non-transitory computer-readable medium described herein may further include operations, features, means, or instructions for determining that address ranges of at least two data blocks of the one or more data blocks may be contiguous within a same sparse file of the set of multiple sparse files in the cloud environment and generating a single read request for the at least two data blocks based on determining that the address ranges of the at least two data blocks are contiguous within the same sparse file, the one or more read requests including at least the single read request.

Some examples of the method, apparatuses, and non-transitory computer-readable medium described herein may further include operations, features, means, or instructions for ordering the address ranges of the one or more data blocks in an ascending or descending order, where transmitting the one or more read requests includes transmitting parallel read requests for the one or more data blocks based on the ascending or descending order.

Some examples of the method, apparatuses, and non-transitory computer-readable medium described herein may further include operations, features, means, or instructions for obtaining the identified one or more data blocks from the one or more sparse files based on the one or more read requests and writing the one or more data blocks to a journal file within a block device at a data management system.

Some examples of the method, apparatuses, and non-transitory computer-readable medium described herein may further include operations, features, means, or instructions for mounting the filesystem on the block device at the data management system and instantiating the one or more data blocks via the mounted filesystem based on the request, the one or more data blocks corresponding to the one or more files requested via the request.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, by a data management system via an interface of the data management system, a request to read one or more files of a filesystem, wherein data of the filesystem is stored across a plurality of sparse files in a cloud environment, the plurality of sparse files comprising respective sets of data blocks;
accessing memory of the data management system, by the data management system and in response to the request to read the one or more files, to retrieve metadata entries from a metadata table stored in the memory of the data management system, wherein the metadata entries are indexed by the one or more files included in the request and the metadata entries comprise one or more target logical address ranges corresponding to the one or more files of the filesystem;
reading, by the data management system and from the cloud environment via a network interface, index information for the plurality of sparse files, wherein the index information indicates respective logical address ranges for data blocks within the plurality of sparse files;
storing, by the data management system in the memory of the data management system and based at least in part on reading the index information, one or more pointers to logical address ranges corresponding to one or more data blocks within one or more sparse files of the plurality of sparse files, wherein storing the one or more pointers is based at least in part on the logical address ranges pointed to by the one or more pointers overlapping with the one or more target logical address ranges corresponding to the one or more files of the filesystem;

transmitting, from the data management system to the cloud environment and via the network interface, one or more read requests for the one or more data blocks, within the one or more sparse files, that are pointed to by the one or more pointers, wherein the one or more read requests are generated based at least in part on the one or more pointers to the logical address ranges that overlap with the one or more target logical address ranges; and receiving, at the data management system from the cloud environment and via the network interface, the requested one or more data blocks based at least in part on the one or more read requests.

2. The method of claim 1, further comprising:
obtaining snapshots of the filesystem, the snapshots comprising at least a first snapshot at a first time and a second snapshot at a second time that is after the first time; and storing the snapshots in in the cloud environment, wherein the snapshots comprise the plurality of sparse files, and wherein a first sparse file associated with the first snapshot comprises a first set of data blocks that represent the filesystem at the first time and a second sparse file associated with the second snapshot comprises a second set of data blocks that represent data blocks from the filesystem at the second time that have changed since the first time.

3. The method of claim 2, further comprising:
executing respective index jobs for the snapshots, wherein executing an index job of the respective index jobs for a snapshot of the snapshots comprises:
storing respective mapping information for the snapshot that indicates respective logical address ranges corresponding to data blocks of the snapshot, the respective logical address ranges within a logical address space associated with the filesystem; and
updating at least one metadata entry of a plurality of metadata entries in the metadata table for the filesystem to include the respective mapping information for the snapshot.

4. The method of claim 3, further comprising:
identifying, within the plurality of metadata entries in the metadata table, one or more metadata entries in the metadata table that are indexed by the one or more files indicated via the request, wherein retrieving the metadata entries is based at least in part on identifying the one or more metadata entries in the metadata table.

5. The method of claim 3, wherein a metadata entry of the plurality of metadata entries in the metadata table comprises a path, an offset, a range, or any combination thereof of one or more logical address ranges corresponding to a respective file of the filesystem.

6. The method of claim 1, wherein:
the one or more pointers are stored in a key-value store at the data management system;
a key of the key-value store for a respective data block comprises an offset of a target logical address range corresponding to the respective data block; and a value of the key-value store for the respective data block comprises an identifier of a sparse file that includes the respective data block, an offset corresponding to the respective data block within the sparse file, and a logical address range corresponding to the respective data block within the sparse file.

7. The method of claim 1, wherein reading the index information comprises:
reading a plurality of index blocks for the plurality of sparse files in the cloud environment based at least in part on the one or more target logical address ranges corresponding to the one or more files, wherein an index block of the plurality of index blocks comprises the index information for a set of data blocks of a respective sparse file of the plurality of sparse files.

8. The method of claim 7, further comprising:
ordering the one or more target logical address ranges corresponding to the one or more files of the filesystem in an ascending or descending order, wherein reading the plurality of index blocks is based at least in part on the ordering of the one or more target logical address ranges.

9. The method of claim 7, wherein a first quantity of bytes in the index block is less than a second quantity of bytes in the set of data blocks.

10. The method of claim 1, further comprising:
determining that logical address ranges of at least two data blocks of the one or more data blocks are contiguous within a same sparse file of the plurality of sparse files in the cloud environment; and
generating a single read request for the at least two data blocks based at least in part on determining that the logical address ranges of the at least two data blocks are contiguous within the same sparse file, the one or more read requests including at least the single read request.

11. The method of claim 1, further comprising:
ordering the logical address ranges of the one or more data blocks in an ascending or descending order, wherein transmitting the one or more read requests comprises transmitting parallel read requests for the one or more data blocks based at least in part on the ascending or descending order.

12. The method of claim 1, further comprising:
writing the one or more data blocks to a journal file within a block device at the data management system based at least in part on receiving the one or more data blocks from the one or more sparse files in the cloud environment based at least in part on the one or more read requests.

13. The method of claim 12, further comprising:
mounting the filesystem on the block device at the data management system; and
instantiating the one or more data blocks via the mounted filesystem based at least in part on the request, the one or more data blocks corresponding to the one or more files requested via the request.

14. An apparatus, comprising:
at least one processor of a data management system;
memory of the data management system, the memory coupled with the at least one processor; and
instructions stored in the memory and executable by the at least one processor to cause the apparatus to:
receive, by the data management system via an interface of the data management system, a request to read one or more files of a filesystem, wherein data of the filesystem is stored across a plurality of sparse files in a cloud environment, the plurality of sparse files comprising respective sets of data blocks;

access the memory of the data management system, by the data management system in response to the request to read the one or more files, to retrieve metadata entries from a metadata table stored in the memory of the data management system, wherein the metadata entries are indexed by the one or more files included in the request and the metadata entries comprise one or more target logical address ranges corresponding to the one or more files of the filesystem;

read, by the data management system and from the cloud environment via a network interface, index information for the plurality of sparse files, wherein the index information indicates respective logical address ranges for data blocks within the plurality of sparse files;

store, by the data management system in the memory of the data management system and based at least in part on reading the index information, one or more pointers to logical address ranges corresponding to one or more data blocks within one or more sparse files of the plurality of sparse files, wherein storing the one or more pointers is based at least in part on the logical address ranges overlapping with the one or more target logical address ranges corresponding to the one or more files of the filesystem;

transmit, from the data management system to the cloud environment and via the network interface, one or more read requests for the one or more data blocks, within the one or more sparse files, that are pointed to by the one or more pointers, wherein the one or more read requests are generated based at least in part on the one or more pointers to the target logical address ranges that overlap with the one or more target logical address ranges; and receive, at the data management system from the cloud environment and via the network interface, the requested one or more data blocks based at least in part on the one or more read requests.

15. The apparatus of claim 14, wherein the instructions are further executable by the at least one processor to cause the apparatus to:

obtain snapshots of the filesystem, the snapshots comprising at least a first snapshot at a first time and a second snapshot at a second time that is after the first time; and store the snapshots in in the cloud environment, wherein the snapshots comprise the plurality of sparse files, and wherein a first sparse file associated with the first snapshot comprises a first set of data blocks that represent the filesystem at the first time and a second sparse file associated with the second snapshot comprises a second set of data blocks that represent data blocks from the filesystem at the second time that have changed since the first time.

16. The apparatus of claim 14, wherein the instructions to read the index information are executable by the at least one processor to cause the apparatus to:

read a plurality of index blocks for the plurality of sparse files in the cloud environment based at least in part on the one or more target logical address ranges corresponding to the one or more files, wherein an index block of the plurality of index blocks comprises the index information for a set of data blocks of a respective sparse file of the plurality of sparse files.

17. A non-transitory computer-readable medium storing code, the code comprising instructions executable by at least one processor to:

receive, by a data management system via an interface of the data management system, a request to read one or more files of a filesystem, wherein data of the filesystem is stored across a plurality of sparse files in a cloud environment, the plurality of sparse files comprising respective sets of data blocks;

access memory of the data management system, by the data management system in response to the request to read the one or more files, to retrieve metadata entries from a metadata table stored in the memory of the data management system, wherein the metadata entries are indexed by the one or more files included in the request and the metadata entries comprise one or more target logical address ranges corresponding to the one or more files of the filesystem;

read, by the data management system and from the cloud environment via a network interface, index information for the plurality of sparse files, wherein the index information indicates respective logical address ranges for data blocks within the plurality of sparse files;

store, by the data management system in the memory of the data management system and based at least in part on reading the index information, one or more pointers to logical address ranges corresponding to one or more data blocks within one or more sparse files of the plurality of sparse files, wherein storing the one or more pointers is based at least in part on the logical address ranges overlapping with the one or more target logical address ranges corresponding to the one or more files of the filesystem;

transmit, from the data management system to the cloud environment and via the network interface, one or more read requests for the one or more data blocks, within the one or more sparse files, that are pointed to by the one or more pointers, wherein the one or more read requests are generated based at least in part on the one or more pointers to the logical address ranges that overlap with the one or more target logical address ranges; and receive, at the data management system from the cloud environment and via the network interface, the requested one or more data blocks based at least in part on the one or more read requests.

18. The non-transitory computer-readable medium of claim 17, wherein the instructions are further executable by the at least one processor to:

obtain snapshots of the filesystem, the snapshots comprising at least a first snapshot at a first time and a second snapshot at a second time that is after the first time; and store the snapshots in in the cloud environment, wherein the snapshots comprise the plurality of sparse files, and wherein a first sparse file associated with the first snapshot comprises a first set of data blocks that represent the filesystem at the first time and a second sparse file associated with the second snapshot comprises a second set of data blocks that represent data blocks from the filesystem at the second time that have changed since the first time.

* * * * *